(12) United States Patent
Hieb

(10) Patent No.: US 7,793,002 B2
(45) Date of Patent: Sep. 7, 2010

(54) METHODS AND APPARATUS FOR IMPLEMENTING A SEQUENTIAL SYNCHRONIZATION HIERARCHY AMONG NETWORKED DEVICES

(75) Inventor: Brandon Hieb, Cedar Park, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 253 days.

(21) Appl. No.: 12/134,563

(22) Filed: Jun. 6, 2008

(65) Prior Publication Data
US 2009/0307336 A1 Dec. 10, 2009

(51) Int. Cl.
*G06F 15/16* (2006.01)
(52) U.S. Cl. .................. 709/248; 707/618
(58) Field of Classification Search ......... 709/200–202, 709/224, 248; 707/612–614, 617–618, 620
See application file for complete search history.

(56) References Cited

U.S. PATENT DOCUMENTS

| | | | |
|---|---|---|---|
| 5,787,439 A | 7/1998 | Taysom | |
| 5,832,487 A | 11/1998 | Olds et al. | |
| 5,924,094 A | 7/1999 | Sutter | |
| 6,192,365 B1 | 2/2001 | Draper et al. | |
| 6,343,299 B1 | 1/2002 | Huang et al. | |
| 6,484,172 B1 | 11/2002 | Lee et al. | |
| 6,615,223 B1 | 9/2003 | Shih et al. | |
| 6,681,370 B2 | 1/2004 | Gounares et al. | |
| 6,751,248 B1 * | 6/2004 | Tan | 375/132 |
| 6,868,414 B2 | 3/2005 | Khanna et al. | |
| 6,968,372 B1 | 11/2005 | Thompson et al. | |
| 7,085,779 B2 | 8/2006 | Holtz et al. | |
| 7,117,491 B2 | 10/2006 | Ferreira Alves et al. | |
| 7,165,248 B2 | 1/2007 | Holtz et al. | |
| 7,302,446 B1 | 11/2007 | Boothby | |
| 7,505,450 B2 * | 3/2009 | Castagnoli | 370/350 |
| 2004/0168174 A1 | 8/2004 | Baker | |
| 2006/0155778 A1 | 7/2006 | Sharma et al. | |
| 2007/0061382 A1 | 3/2007 | Davis et al. | |
| 2008/0005188 A1 | 1/2008 | Li et al. | |
| 2008/0005195 A1 | 1/2008 | Li | |

FOREIGN PATENT DOCUMENTS

WO 2008014062 1/2008

OTHER PUBLICATIONS

Intellectual Property Office of Great Britain, "Search Report," issued in connection with counterpart Great Britain application No. GB0909093.7, mailed Aug. 28, 2009, 3 pages.

* cited by examiner

*Primary Examiner*—Moustafa M Meky
(74) *Attorney, Agent, or Firm*—Hanley, Flight & Zimmerman, LLC.

(57) ABSTRACT

Methods and apparatus for implementing a sequential synchronization hierarchy among networked devices are disclosed. An example synchronization method disclosed herein comprises configuring a first networked node to be a parent node associated directly with second and third networked nodes configured to be respective first and second direct child nodes, selecting other networked nodes to be a set of indirect child nodes associated indirectly with the parent node through the first direct child node, and configuring the parent node to send information undergoing synchronization to the direct child nodes sequentially based on a plurality of hierarchical synchronization levels associated with the direct child nodes, but to not send the information to the set of indirect child nodes, wherein the first direct child node is to propagate the information to the set of indirect child nodes while the parent node is to send the information to the second direct child node.

24 Claims, 19 Drawing Sheets

METHODS AND APPARATUS FOR IMPLEMENTING A SEQUENTIAL SYNCHRONIZATION HIERARCHY AMONG NETWORKED DEVICES

FIELD OF THE DISCLOSURE

This disclosure relates generally to data networking and, more particularly, to methods and apparatus for implementing a sequential synchronization hierarchy among networked devices.

BACKGROUND

Modern process control systems often include data networks to interconnect multiple, and possibly numerous, networked nodes, such as controllers, workstations, etc. Such process control systems typically require certain common information to be available at some or all of the networked nodes. Examples of information that may be need to be commonly available include the addresses of some or all the nodes in the system, display configuration information for generating common displays at various nodes in the system, etc. In many implementations, the common information is stored as one or more configuration files on each node. When one or more of these configuration files change, the updated file(s) need to be synchronized between system nodes as quickly as possible to keep the common information current. However, file synchronization is often a low priority operation performed in a sequential manner due to the limited resources (e.g., processor speed, network bandwidth, etc.) characteristic of the type of nodes used to implement process control systems. Limited node resources can preclude the use of existing file synchronization techniques that are more sophisticated, and therefore faster, than the slower approach of sending an updated configuration file sequentially from an originating node to each of the other nodes in the process control system.

SUMMARY

In an example embodiment disclosed herein, an example method to synchronize information within a hierarchical synchronization topology comprising a plurality of networked nodes includes configuring a first networked node to be a parent node associated directly with second and third networked nodes configured to be respective first and second direct child nodes of the parent node. The example method also includes selecting one or more networked nodes to be a first set of indirect child nodes associated indirectly with the parent node through the first direct child node. Furthermore, the example method includes configuring the parent node to send information undergoing synchronization to the first and second direct child nodes sequentially based on a plurality of hierarchical synchronization levels to which the first and second direct child nodes are associated, but to not send the information to the first set of indirect child nodes. Additionally, in an example implementation, the first direct child node is to propagate the information to the first set of indirect child nodes while the parent node is to send the information to the second direct child node.

In another example embodiment disclosed herein, an example apparatus to synchronize information obtained by a networked node includes an example node selector to select a plurality of direct child nodes to receive the information undergoing synchronization directly from the networked node. The example apparatus also includes an example node list segmenter to select one or more sets of indirect child nodes, wherein each set of indirect child nodes is to receive the information undergoing synchronization through a respective direct child node instead of directly from the networked node. Furthermore, the example apparatus includes an example synchronization sequencer to schedule sending the information undergoing synchronization to a first direct child node associated with a first hierarchical synchronization level before sending the information to a second direct child node associated with a second hierarchical synchronization level having a lower priority than the first hierarchical synchronization level. Additionally, in an example implementation, a first set of indirect child nodes is to receive the information through the first direct child node, and the synchronization sequencer is to schedule sending the information to the first direct child node after the first direct child node has been configured to receive the information from the networked node regardless of whether the first set of indirect child nodes is configured to receive the information undergoing synchronization through the first direct child node.

In still another example embodiment disclosed herein, an example data network to support data synchronization includes a plurality of networked nodes configurable to implement a synchronization hierarchy comprising a plurality of hierarchical synchronization levels, wherein each networked node assigned to a first hierarchical level is configurable to synchronize data received from one respectively configured parent node assigned to a second hierarchical synchronization level having a higher priority than the first hierarchical synchronization level. Each networked node assigned to such a first hierarchical level in the example data network is also configurable to transmit the data sequentially to a respective plurality of correspondingly configured child nodes assigned uniquely to a respective plurality of hierarchical synchronization levels each having a lower priority than the first hierarchical synchronization level. Additionally, the example data network also includes a root node assignable to a highest priority synchronization level and configurable to obtain the data to be synchronized, to initiate configuration of the synchronization hierarchy and to transmit the data sequentially based on the synchronization hierarchy to a first plurality of correspondingly configured child nodes. In an example implementation, the first child node in the first plurality of child nodes is also configurable to be a first parent node to sequentially transmit the data based on synchronization hierarchy to a second plurality of correspondingly configured child nodes after receiving the data from the root node and while the root node is to transmit the data to at least a second child node in the first plurality of child nodes.

DETAILED DESCRIPTION

Methods and apparatus for implementing a sequential synchronization hierarchy among networked devices are disclosed herein. In an example sequential synchronization hierarchy, each networked node at a particular assigned hierarchical synchronization level, with the exception of one node configured as a root node, is configured to operate as a child node to one associated parent node assigned to a higher priority synchronization level. Additionally, at least some networked nodes are configured to operate as parent nodes to one or more associated child nodes at lower priority synchronization levels. To synchronize information, such as one or more data files, in the example synchronization hierarchy, each parent node sends the information sequentially to each of its associated child nodes. Furthermore, once a child node receives the information, that child node continues to send the information sequentially to its own associated child nodes. As such, the information undergoing synchronization may be propagated simultaneously along several parent-child propagation paths, with each parent-child path employing sequential information propagation.

Such example synchronization hierarchies as described herein can improve the rate at which information in a network may be synchronized as compared to a sequential propagation of information between networked nodes. Furthermore, because each individual networked node still sends information sequentially to its associated child nodes, the improvement in synchronization speed is achieved with little or no additional resource requirements over exchanging information sequentially among nodes. Additionally, in at least some of the network implementations described herein, each networked node is responsible for configuring only a portion of the overall synchronization topology, for example, only any directly associated child nodes. Such distributed topology configuration also lessens the impact on resources used for information synchronization, while also allowing synchronization to begin even though configuration of the entire hierarchical synchronization topology may not be complete. Graceful addition and/or removal of networked nodes to/from the hierarchical synchronization topology is also supported by at least some of the example implementations described herein.

Figure 1:
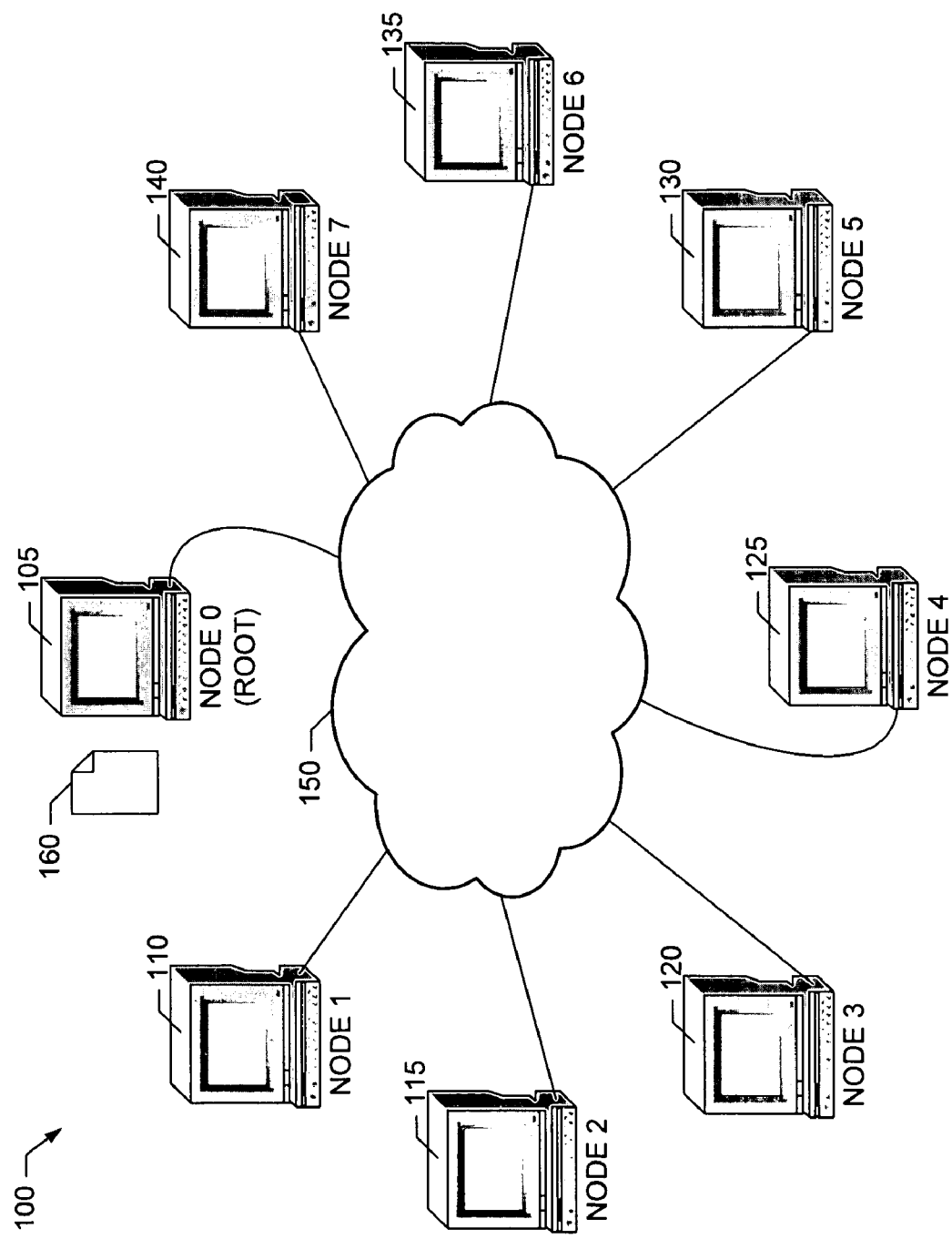
FIG. 1 is a block diagram of an example process control system.

A block diagram of an example process control system 100 is illustrated in FIG. 1. The example process control system 100 may be used to measure, analyze, control, automate, etc., any type of process in any type of industry. For example, the process control system 100 of FIG. 1 may be used to control the output of a chemical manufacturing process, a refining process (e.g., such as for oil or natural gas), a pulp and paper manufacturing process, a pharmaceutical development process, a food and beverage packaging process, a power generation process, a water and/or wastewater management process, etc.

The process control system 100 of the illustrated example includes a group of example networked nodes 105-140 interconnected by an example network 150. Although eight (8) networked nodes 105, 110, 115, 120, 125, 130, 135 and 140 labeled, respectively, Node 0, Node 1, Node 2, Node 3, Node 4, Node 5, Node 6 and Node 7 are depicted in FIG. 1, the example process control system 100 may support any number of networked nodes. The networked nodes 105-140 may be implemented by any combination of devices capable of being networked to exchange information. For example, each of the networked nodes 105-140 may be implemented by a controller, such as a programmable logic controller (PLC), a workstation, such as a personal computer, a laptop/notebook computer, a computer terminal, etc., and/or any other type of networkable device.

The network 150 of the illustrated example is configured to allow information to be exchanged among the group of example networked nodes 105-140. Additionally, the example network 150 is configured to be scalable to allow the addition and removal of networked nodes over time as process control requirements change. The example network 150 may be implemented using any type of network technology, such as, for example, one or more Ethernet or similar local area networks (LANs), one or more IEEE 802.11 or similar wireless LANs (WLANs), one or more mobile cellular networks, the Internet, dedicated network interconnections, etc., and/or any combination thereof.

As previously mentioned, the example network 150 allows information to be exchanged among the example networked nodes 105-140. In a process control system such as the example system 100 of FIG. 1, it may be required, or at least desirable, to have certain information commonly available among some or all of the networked nodes 105-140. Depending upon the process being controlled by the example process control system 100, examples of such common information to be made available at some or all of the networked nodes 105-140 include: (1) a list of some or all the networked nodes 105-140 in the example process control system 100, (2) the addresses of some or all of the networked nodes 105-140 and/or other network devices implementing and/or providing connectivity to the example process control system 100 (e.g., such as bridge(s), router(s), etc.), (3) display configuration information for generating common displays at various networked nodes 105-140 in the example process control system 100, etc.

In the example process control system 100, as well as in many other process control system implementations, common information is stored in one or more configuration files on some or all of the networked nodes 105-140. For example, FIG. 1 illustrates an example configuration file 160 (or, more generally, information file 160) that includes common information to be made available to and stored on each of the example networked nodes 105-140. Because the example configuration file 160 is expected to be common and, thus, the same on each networked node 105-140, the updated file 160 needs to be synchronized among the networked nodes 105-140 when the file 160 is updated and/or changed. Generally, such information synchronization should occur as quickly as possible to keep the common information up to date on each of the affected networked nodes 105-140. Example synchronization techniques are discussed in greater detail below.

Although illustrated as a process control system, the example system 100 could be any type of computer network, data network, etc., in which information can be exchanged among networked nodes. As such, the example methods and apparatus described herein are not limited to use in only a process control environment, but may be used in any type of data networking application.

Figure 2:
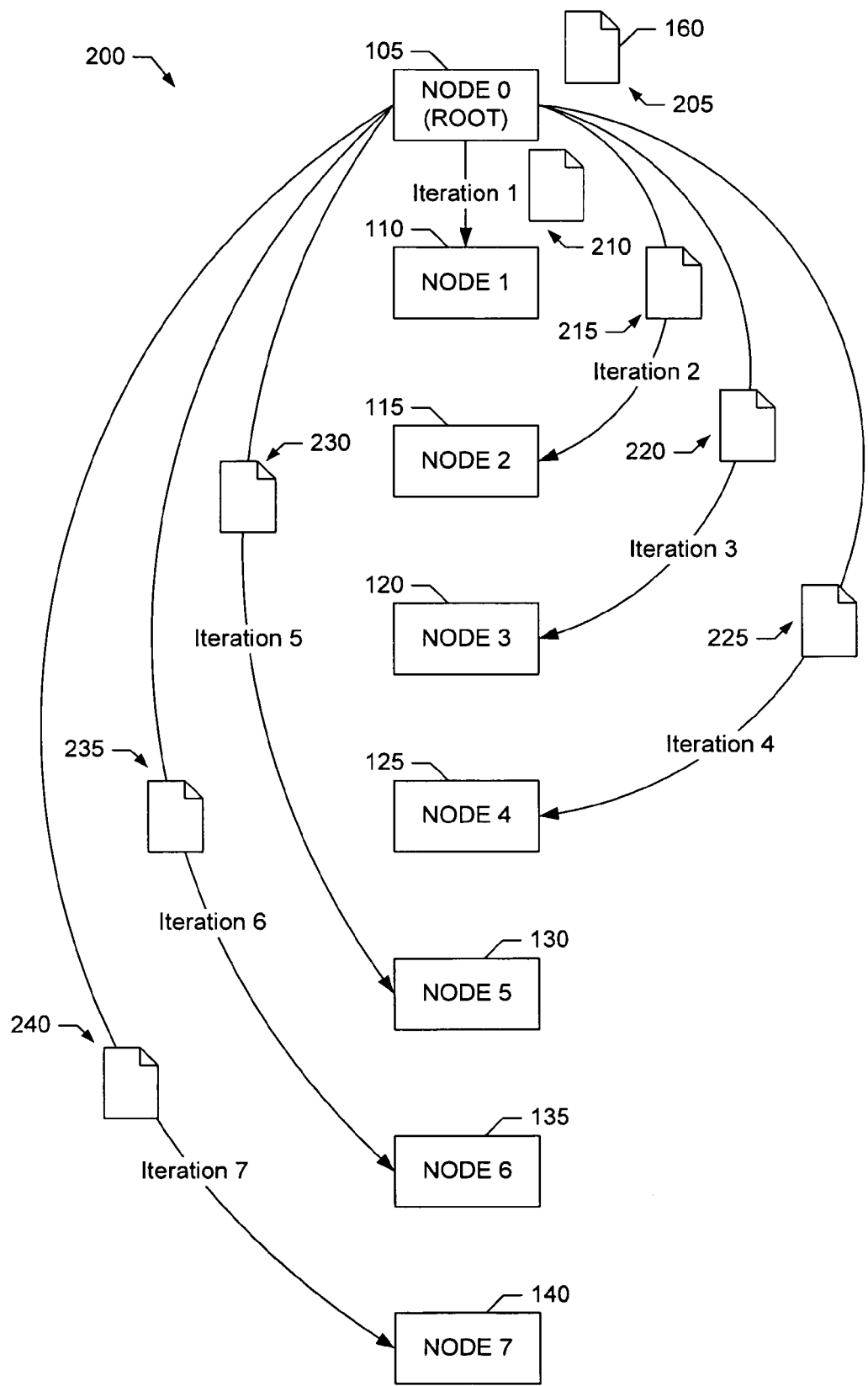
FIG. 2 is an illustration of an example prior art sequential file synchronization technique that may be used to propagate an information file sequentially to networked nodes in the example system of FIG. 1.

An example prior art sequential file synchronization technique 200 that may be used to synchronize the configuration file 160 within the example process control system 100 of FIG. 1 is illustrated in FIG. 2. Because the example prior art sequential file synchronization technique 200 of FIG. 2 is illustrated in the context of the example process control system 100 of FIG. 1, like elements in FIGS. 1 and 2 are labeled with the same reference numerals. For brevity, the detailed descriptions of these like elements are provided above in connection with the discussion of FIG. 1 and, therefore, are not repeated in the discussion of FIG. 2.

Turning to FIG. 2, the example prior art sequential file synchronization technique 200 synchronizes the configuration file 160 within the example process control system 100 by propagating the configuration file 160 sequentially to each of the networked nodes 105-140. For example, and without loss of generality, assume that a new version of the configuration file 160 is provided to the networked node 105 (Node 0) during an initialization phase 205 of the example prior art sequential file synchronization technique 200, as shown in FIG. 2. The new version of the configuration file 160 may be created, for example, offline by a user and/or application and downloaded to the networked node 105 (Node 0). Additionally or alternatively, the new version of the configuration file 160 may be created by the networked node 105 (Node 0) itself based on information downloaded, queried, monitored, received, etc., by the networked node 105 (Node 0).

Regardless of how the new version of the configuration file 160 is created, the example prior art sequential file synchronization technique 200 begins sequential file synchronization after the configuration file 160 is made available to the networked node 105 (Node 0) during the initialization phase 205. In the illustrated example, the prior art sequential file synchronization technique 200 begins file synchronization by causing the networked node 105 (Node 0) to send the configuration file 160 to the networked node 110 (Node 1) during a first iteration phase 210. Next, after the configuration file 160 is sent to the networked node 110 (Node 1), the networked node 105 (Node 0) then sends the configuration file 160 to the networked node 115 (Node 3) during a second iteration phase 215. Similarly, the example prior art sequential file synchronization technique 200 continues to cause the networked node 105 (Node 0) to send the configuration file 160 sequentially to each networked node 120, 125, 130, 135 and 140 during respective iteration phases 220, 225, 230, 235 and 240.

In the example prior art sequential file synchronization technique 200, after the networked node 105 (Node 0) completes sending the configuration file 160 to the networked node 140 (Node 7) during the seventh iteration 240, the new version of the configuration file 160 is then synchronized on all networked nodes 105-140. Because the configuration file 160 is propagated sequentially to each of the networked nodes 105-140 to achieve synchronization, the total time required to synchronize the configuration file 160 according to the example prior art sequential file synchronization technique 200 is proportional to the number of networked nodes 105-140 in the example process control system 100. In other words, the example prior art file sequential synchronization technique 200 has a time complexity of order n, denoted O(n), where n is the number of networked nodes 105-140 in the example process control system 100. Thus, in the illustrated example of the prior art sequential file synchronization technique 200, the time complexity is O(8) because there are n=8 networked nodes 105-140 in the example process control system 100.

Because the example prior art sequential file synchronization technique 200 has a time complexity of O(n), the amount of time needed to synchronize information, such as the example configuration file 160, using this technique increases linearly with the number of networked nodes 105-140 in the example process control system 100. As the number of networked nodes 105-140 becomes large, the process delay incurred by information synchronization may become unacceptable. For example, some process control systems may have hundreds, or even thousands, of networked nodes. In such systems, the example prior art sequential file synchronization technique 200 may require minutes, or even hours, to complete information synchronization.

Figure 3:
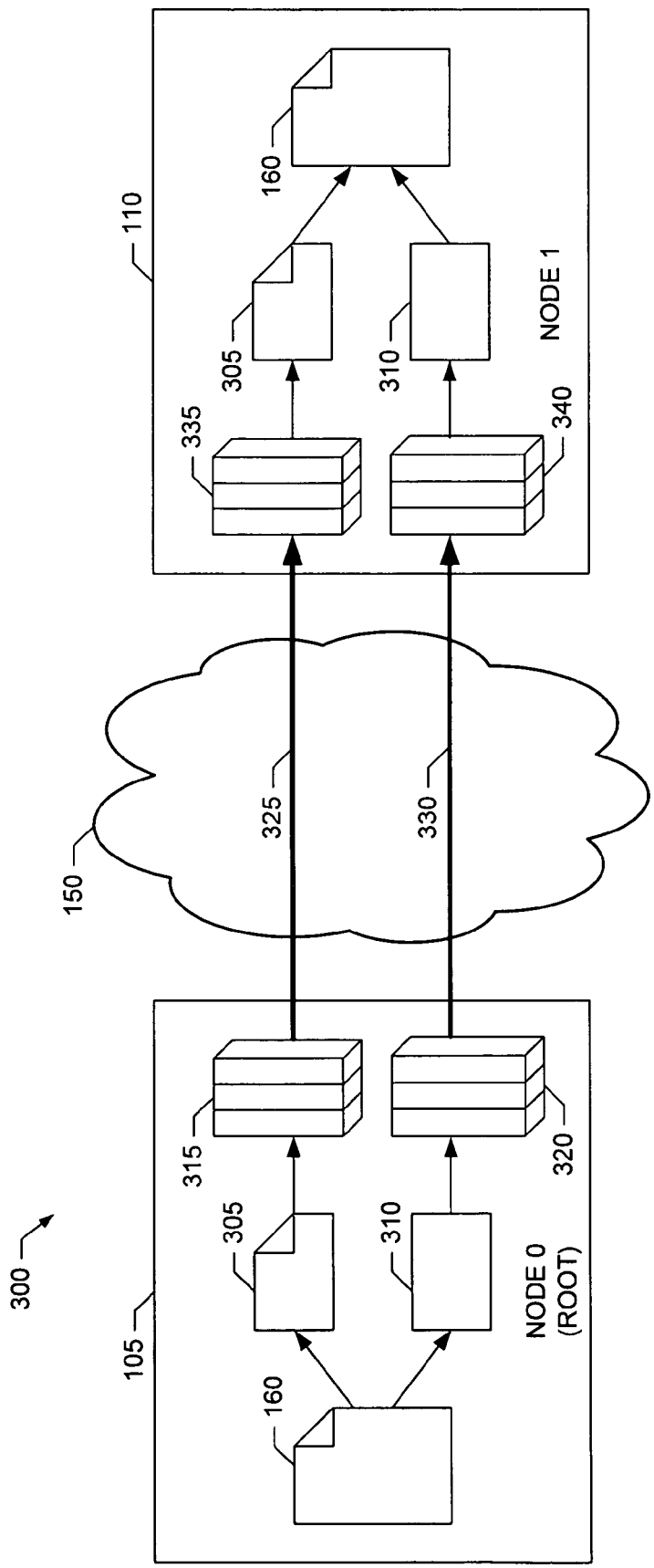
FIG. 3 is an illustration of an example prior art parallel file synchronization technique that may be used to propagate portions of an information file in parallel between networked nodes in the example system of FIG. 1.

An example prior art parallel file synchronization technique 300 that may be used to synchronize the configuration file 160 within the example process control system 100 of FIG. 1 is illustrated in FIG. 3. The example prior art parallel file synchronization technique 300 operates to segment information and propagate the segmented information in parallel to reduce overall synchronization time relative to, for example, the prior art sequential file synchronization technique 200 of FIG. 2. Because the example prior art parallel file synchronization technique 300 of FIG. 3 is illustrated in the context of the example process control system 100 of FIG. 1, like elements in FIGS. 1 and 3 are labeled with the same reference numerals. For brevity, the detailed descriptions of these like elements are provided above in connection with the discussion of FIG. 1 and, therefore, are not repeated in the discussion of FIG. 3.

Turning to FIG. 3, the example prior art parallel file synchronization technique 300 synchronizes the configuration file 160 within the example process control system 100 by segmenting the configuration file 160 and propagating the segments in parallel to each of the networked nodes 105-140. For example, and without loss of generality, FIG. 3 illustrates operation of the example prior art parallel file synchronization technique 300 to synchronize the configuration file 160 between the networked node 105 (Node 0) and the networked node 110 (Node 1). In the illustrated example, synchronization begins with the networked node 105 (Node 0) segmenting the configuration file into multiple segments, such as the two file segments 305 and 310 shown in FIG. 3. Although FIG. 3 depicts the configuration file 160 being segmented into two file segments 305 and 310, the example prior art parallel file synchronization technique 300 supports segmentation into any number of file segments.

Continuing with the illustrated example of FIG. 3, the file segments 305 and 310 are stored by the example networked node 105 (Node 0) in respective transmit synchronization buffers 315 and 320. The transmit synchronization buffers 315 and 320 may be implemented using any storage technique, such as via one or more circular buffers, first-in-first-out (FIFO) buffers, etc. The file segments 305 and 310 stored in the respective transmit synchronization buffers 315 and 320 are then sent from each buffer in parallel by the networked node 105 (Node 0) to a recipient node. For example, FIG. 3 illustrates two propagation paths 325 and 330 implemented in the example network 150 to allow data from the transmit synchronization buffers 315 and 320 of the network node 105 (Node 0) to be sent in parallel to respective receive synchronization buffers 335 and 340 of the example network node 110 (Node 1). In the example network node 110 (Node 1), the data received and stored in the respective receive synchronization buffers 335 and 340 is then used to reconstruct the file segments 305 and 310 corresponding to the configuration file 160 being synchronized. The file segments 305 and 310 are then merged to form the configuration file 160, resulting in the configuration file 160 being synchronized at the network node 110 (Node 1)

It is apparent from this example that the total time required for synchronization according to the example prior art parallel file synchronization technique 300 is reduced proportionately relative to the synchronization time of the example prior art sequential file synchronization technique 200 by the number of segments of the configuration file 160 that are transmitted in parallel between nodes. In other words, the time complexity of the example prior art parallel file synchronization technique 300 is O(n/s), where n is the number of networked nodes 105-140 in the example process control system 100, and s is the number of segments of the configuration file 160 that are transmitted in parallel between nodes. Thus, in the illustrated example of the prior art parallel file synchronization technique 300, the time complexity is O(8/2=4) because there are n=8 networked nodes 105-140 in the example process control system 100 and the configuration file 160 is transmitted in parallel as s=2 segments.

Unfortunately, such a reduction in overall synchronization time comes at the expense of increased resource utilization by the synchronization procedure. For example, the segmenting and parallel transmission required by the example prior art parallel file synchronization technique 300 can require a corresponding increase in the processing (e.g., CPU), memory and/or network bandwidth resources consumed by each of the networked nodes 105-140 for information (e.g., file) synchronization. However, the limited resources characteristic of the type of nodes used to implement process control systems may preclude implementation of the example prior art parallel file synchronization technique 300 in many process control environments.

Figure 4:
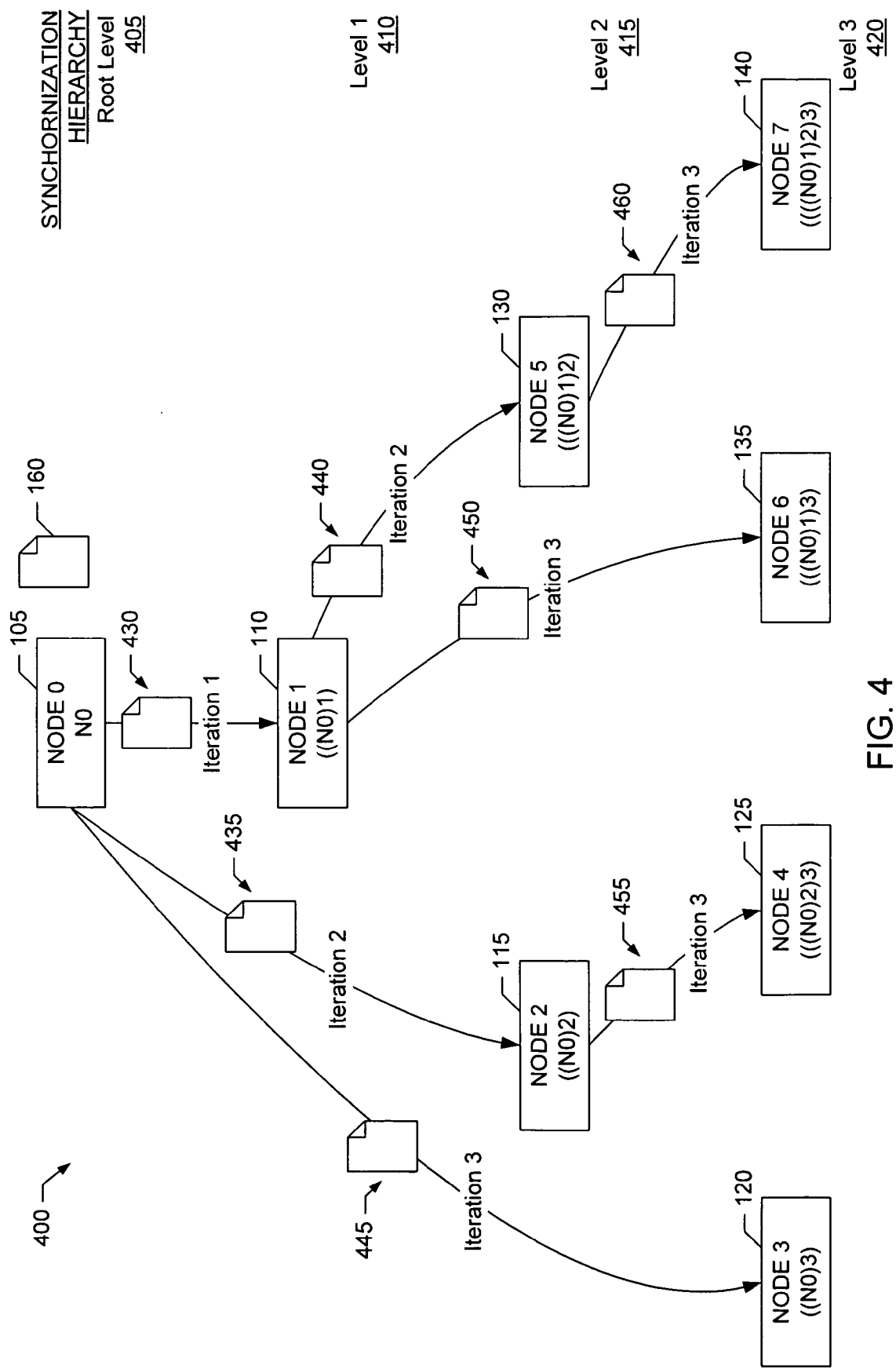
FIG. 4 is an illustration of an example file synchronization technique employing an example sequential synchronization hierarchy as described herein to propagate an information file among networks nodes in the example system of FIG. 1.

An example sequential synchronization hierarchy 400 implemented according to the methods and apparatus described herein that may be used to synchronize the configuration file 160 within the example process control system 100 of FIG. 1 is illustrated in FIG. 4. In an example implementation, the example sequential synchronization hierarchy 400 operates to reduce overall synchronization time relative to the example prior art sequential file synchronization technique 200 of FIG. 2, but without incurring the additional resource utilization characteristic of the example prior art sequential file synchronization technique 300 of FIG. 3. Because the example sequential synchronization hierarchy 400 of FIG. 4 is illustrated in the context of the example process control system 100 of FIG. 1, like elements in FIGS. 1 and 4 are labeled with the same reference numerals. For brevity, the detailed descriptions of these like elements are provided above in connection with the discussion of FIG. 1 and, therefore, are not repeated in the discussion of FIG. 4.

Turning to FIG. 4, for the purposes of information (e.g., file) synchronization, the example networked nodes 105-140 of the example process control system 100 are configured to form the example sequential synchronization hierarchy 400 as shown. In the illustrated example, each networked node is assigned to a particular hierarchical synchronization level, with each successive level having a lower synchronization priority than preceding levels. For example, in the sequential synchronization hierarchy 400 of FIG. 4, the networked node 105 (Node 0) is assigned to a root hierarchical synchronization level 405 (or root level 405), the networked node 110 (Node 1) is assigned to a first hierarchical synchronization level 410 (or first level 410), the networked nodes 115 (Node 2) and 130 (Node 5) are assigned to a second hierarchical synchronization level 415 (or second level 415), and the networked nodes 120 (Node 3), 125 (Node 4), 125 (Node 6) and 140 (Node 7) are assigned to a third hierarchical synchronization level 415 (or third level 415). In the illustrated example, the root level 405 has the highest synchronization priority, followed by the first level 410, then the second level 415, and with the third level 420 having the lowest priority. Generally, the example sequential synchronization hierarchy 400 will include only one networked node (e.g., the networked node 105) at the root level and only one networked node (e.g., the networked node 110) at the first level. Each successive level (e.g., levels 415 and 420) can be assigned a number of networked nodes up to the number of networked nodes included in all the preceding levels combined.

With the exception of the root node (e.g., the networked node 105), each networked node at a particular assigned hierarchical synchronization level in the example sequential synchronization hierarchy 400 is configured to operate as a child node to one associated parent node assigned to a higher priority synchronization level. Additionally, in the illustrated example, no two networked nodes assigned to the same hierarchical synchronization level are associated with the same parent node. For example, the networked node 110 (Node 1) at the first level 410 is configured to be a child node of the networked node 105 (Node 0), which is assigned to the higher priority root level 405 and correspondingly configured to be the parent node associated with the networked node 110 (Node 1). The networked node 115 (Node 2) at the second level 415 and the networked node 120 (Node 3) at the third level 420 are each also configured to be child nodes of the networked node 105 (Node 0), which is correspondingly configured to be their associated parent node.

Similarly, the networked node 130 (Node 5) at the second level 415 and the networked node 135 (Node 6) at the third level 420 are each configured to be child nodes of the networked node 110 (Node 1), which is assigned to the higher priority first level 410 and correspondingly configured to be their associated parent node. Furthermore, the networked node 125 (Node 4) at the third level 420 is configured to be a child node of the networked node 115 (Node 2), which is assigned to the higher priority second level 415 and correspondingly configured to be its associated parent node. Finally, the networked node 140 (Node 7) at the third level 420 is configured to be a child node of the networked node 130 (Node 5), which is assigned to the higher priority second level 415 and correspondingly configured to be its associated parent node.

As well as being configured to operate as a child node to one associated parent node assigned to a higher priority synchronization level, each networked node at a particular assigned hierarchical synchronization level in the example sequential synchronization hierarchy 400 may also be configured to operate as a parent node to one or more associated child nodes at corresponding one or more lower priority synchronization levels. Thus, in the illustrated example, the networked node 105 (Node 0) is configured to operate as a parent node to the networked node 110 (Node 1) at the first level 410, the networked node 115 (Node 2) at the second level 415 and the networked node 120 (Node 3) at the third level 420. Similarly, the networked node 110 (Node 1) is configured to operate as a parent node to the networked node 130 (Node 5) at the second level 415 and the networked node 135 (Node 6) at the third level 420. Additionally, the networked node 115 (Node 2) is configured to operate as a parent node to the networked node 125 (Node 4) at the third level 420, and the networked node 130 (Node 5) is configured to operate as a parent node to the networked node 140 (Node 7) also at the third level 420.

Summarizing, the example sequential synchronization hierarchy 400 organizes the networked nodes 105-140 of the example process control system 100 into a particular hierarchical arrangement having log 2(n) hierarchical synchronization levels (e.g., the levels 410-420) and one root level (e.g., the root level 405), where n is the number of networked nodes. In the illustrated example, the root (highest) level 405 and the first level 410 of the hierarchy each contain one (1) node (e.g., the networked node 105 and the networked node 110). The second level 415 of the example sequential synchronization hierarchy 400 contains two (2) nodes (e.g., the networked nodes 115 and 130). The third level 420 contains four (4) nodes (e.g., the networked nodes 120, 125, 135 and 140), and so on. Finally, the last (lowest) level of the example sequential synchronization hierarchy 400 contains up to n/2 nodes, which in the illustrated example of FIG. 4 corresponds to the third level 420 containing 8/2=4 nodes.

Additionally, in the example sequential synchronization hierarchy 400, each node at a particular assigned hierarchical synchronization level is configured to be associated with one parent node in one of the higher priority synchronization levels, with no two nodes at the same level being assigned to the same parent node. Furthermore, each node at a particular assigned level can be associated directly with up to one child node in each of the remaining lower levels of the example sequential synchronization hierarchy 400. In other words, each child directly associated with a particular parent node is assigned to a unique hierarchical synchronization level. Thus, each node in the example sequential synchronization hierarchy 400, with the exception of the root node, is directly associated with one parent node and zero, one or more child nodes.

Moreover, a child node can also be a parent node itself that is associated with one or more child nodes. Thus, a node in the example sequential synchronization hierarchy 400 that is associated directly with one or more child nodes may also be associated indirectly with those additional child nodes associated with the node's children. For example, and referring to FIG. 4, the networked nodes 110 (Node 1), 115 (Node 2) and 120 (Node 3) are all child nodes associated directly with the root networked node 105 (Node 0) operating as a parent node. In other words, the networked nodes 110 (Node 1), 115 (Node 2) and 120 (Node 3) are all direct child nodes associated directly with the parent networked node 105 (Node 0). Additionally, the networked nodes 125 (Node 4), 130 (Node 5), 135 (Node 6) and 140 (Node 7) are all descendents (either directly or indirectly) of the direct child nodes 110 (Node 1), 115 (Node 2) and 120 (Node 3) associated with the parent node 105 (Node 0). Accordingly, the networked nodes 125 (Node 4), 130 (Node 5), 135 (Node 6) and 140 (Node 7) are all indirect child nodes of the parent networked node 105 (Node 0). Broadly stated, the descendent nodes of a particular parent node in the example sequential synchronization hierarchy 400 can be divided into a group of direct child nodes associated directly with the parent node and a group of indirect child nodes associated indirectly with the parent node through the group of direct child nodes. Additionally, the entire group of indirect child nodes can be further divided into subgroups of child nodes, with each subgroup including all descendent nodes associated with the parent node through a particular direct child node.

As will be demonstrated below, the example sequential synchronization hierarchy 400 implements an information synchronization technique having a reduced time complexity of O(log 2(n)), where n is the number of networked nodes 105-140 in the example process control system 100. Thus, in the example sequential synchronization hierarchy 400 illustrated in FIG. 4, the time complexity is O(log 2(8)=3) because there are n=8 networked nodes 105-140 in the example process control system 100. The time complexity of the example sequential synchronization hierarchy 400 is, therefore, less than the time complexity of both prior art synchronization techniques 200 and 300. Additionally, such a reduction in synchronization time is achieved while still requiring only sequential transmission of information (e.g., files) between the networked nodes.

At a high level, to synchronize information, such as a data file, among all networked nodes configured to form a sequential synchronization hierarchy as described herein, each node sends the information (e.g., data file) undergoing synchronization sequentially to each of its associated direct child nodes. Moreover, each node sends the information (e.g., data file) sequentially to its associated direct child nodes in descending order of priority according to the set of hierarchical synchronization level to which its associated direct child nodes are assigned. For example, synchronization begins when the root node obtains the information to be synchronized as, for example, an updated version of the data file. The root node then sends the updated file to its direct child node in the first hierarchical synchronization level of the synchronization hierarchy. Subsequently, synchronization continues with each node assigned to a particular hierarchical synchronization level being configured to receive the updated file undergoing synchronization from only its one parent node located in one of the higher priority levels of the synchronization hierarchy. After receiving the updated file from its assigned parent node, the node the sends the file sequentially to each of its associated direct child nodes in the lower priority levels of the synchronization hierarchy. Because each node sends the updated file sequentially to its associated direct child nodes, there is no (or negligible) additional impact on the resources of each node dedicated to file synchronization relative to the example prior art sequential synchronization technique 200 of FIG. 2. However, the propagation of the information (e.g., data file) undergoing synchronization occurs simultaneously along several parent-child propagation paths, with each parent-child path employing sequential information propagation according to its respective set of hierarchical synchronization level assignments. This arrangement can attain a potentially significant reduction in overall synchronization time relative to the example prior art sequential synchronization technique 200 of FIG. 2.

Turning to the specific example of FIG. 4, the configuration file 160 can be synchronized among all networked nodes 105-140 of the example sequential synchronization hierarchy 400 in the following manner. First, after obtaining the updated configuration file 160, the root networked node 105 (Node 0) performs a first file transfer 430 during a first synchronization iteration to send the configuration file 160 to its direct child networked node 110 (Node 1) assigned to the first hierarchical synchronization level 410. Subsequently, file transfers occur sequentially between parent and child nodes to synchronize the file among all nodes in the system. For example, during a second synchronization iteration, the root node 105 (Node 0) performs a second file transfer 435 to send the configuration file 160 to its direct child node 115 (Node 2) assigned to the second level 415, while at substantially the same time the networked node 110 (Node 1) performs a third file transfer 440 to send the configuration file 160 to its own direct child node 130 (Node 5) assigned to the second level 415. Then, during a third synchronization iteration, the root node 105 (Node 0) performs a fourth file transfer 445 to send the configuration file 160 to its direct child node 120 (Node 3) assigned to the third level 420, while at substantially the same time the networked node 110 (Node 1) performs a fifth file transfer 450 to also send the configuration file 160 to its own direct child node 135 (Node 6) assigned to the third level 420, the networked node 115 (Node 2) performs a sixth file transfer 455 to also send the configuration file 160 to its own direct child node 125 (Node 4) assigned to the third level 420, and the networked node 130 (Node 5) performs a seventh file transfer 460 to also send the configuration file 160 to its own direct child node 140 (Node 7) assigned to the third level 420. In this way, the configuration file 160 is synchronized among all the nodes 105-140 of the example sequential synchronization hierarchy 400 after three (3) synchronization iterations, as opposed to seven (7) iterations that would be required if, for example, synchronization had been performed according to the example prior art sequential synchronization technique 200 of FIG. 2. More generally, the number of synchronization iterations needed to synchronize information in the example sequential synchronization hierarchy 400 is proportional to the number of hierarchical synchronization levels, yielding a time complexity of $O(\log 2(n))$, where log 2(n) is the number of hierarchical synchronization levels in the sequential synchronization hierarchy 400.

Any type of file transfer protocol or, more generally, protocol for information exchange may be used to send the configuration file 160 between networked nodes in the example sequential synchronization hierarchy 400. Examples of protocols that may be used to send the configuration file 160 between the networked nodes include the File Transfer Protocol (FTP), the Simple Mail Transfer Protocol (SMTP), the Short Message Service (SMS), etc. Additionally or alternatively, one or more proprietary file transfer/information exchange protocols may be used to synchronize information and/or data files between networked nodes in the example sequential synchronization hierarchy 400.

The example sequential synchronization hierarchy 400 of FIG. 4 also supports the addition and removal of nodes from the example process control system 100. In an example implementation, when a new networked node is added to an existing sequential synchronization hierarchy (such as the example sequential synchronization hierarchy 400), the root node randomly selects a networked node from the lowest priority hierarchical synchronization level, or in other words, a leaf node of the example sequential synchronization hierarchy, to be the parent node associated with the newly added networked node. The root node then configures the newly added network node to be a direct child node associated directly with the randomly selected leaf node. Turning to the illustrated example of FIG. 4, when a new node is to be added to the example sequential synchronization hierarchy 400, the root node 105 (Node 0) randomly selects one of the leaf nodes 120 (Node 3), 125 (Node 4), 135 (Node 6) or 140 (Node 7) of the lowest priority third level 420 and assigns the newly added node to be a child node of the selected leaf node.

Additionally, in an example implementation, when an existing networked node is to be removed (e.g., prospectively during a planned network reconfiguration or retrospectively after detecting an error condition, outage, etc.) from an existing sequential synchronization hierarchy (such as the example sequential synchronization hierarchy 400), all of the removed node's associated descendent nodes are automatically reassigned to be descendents of the root node. For example, the root node could be configured to select one of the descendent nodes of the removed node to be a new direct child node associated directly with the root node at a new lowest priority hierarchical synchronization level, thereby placing this new child node at a lower priority level than any existing direct child node already directly associated with the root node. The root node could then configure any remaining descendent nodes previously associated with the removed node to now be indirect nodes associated indirectly with the root node through the newly configured direct child node. Turning to the illustrated example of FIG. 4, if the networked node 130 (Node 5) were removed from the example sequential synchronization hierarchy 400, the root node 105 (Node 0) could reconfigure the removed node's descendent node 140 (Node 7) to be a direct child node associated directly with the root node 105 (Node 0) at a new lowest priority fourth hierarchical synchronization level (not shown).

Furthermore, in an example implementation, the root node monitors the overall configuration of the sequential synchronization hierarchy (such as the example sequential synchronization hierarchy 400). If one or more parent-child (or, more specifically, parent-child-descendent) propagation paths through the synchronization hierarchy become significantly longer than the others due to node addition and/or removal, the root node may destroy the existing synchronization hierarchy and initiate reconfiguration of a sequential synchronization hierarchy as discussed in greater detail below.

FIG. 4 also illustrates a convenient notation that may be used to represent a networked node's hierarchical level assignment and parent-child-descendent relationships in the example sequential synchronization hierarchy 400. In the illustrated example, when a networked node is configured for inclusion in the example sequential synchronization hierarchy 400 by assigning the node to be a direct child of an associated parent node, the configured node is labeled using the following recursive format: "((<parent label>)<assigned child hierarchical synchronization level>)." The root node 105 (Node 0) is labeled N0 to initialize the notational format.

Thus, according to this labeling convention, the networked node 110 (Node 1) is labeled ((N0)1), indicating that it is the direct child node of the root node N0 at the first hierarchical synchronization level 405. Similarly, the networked nodes 115 (Node 2) and 120 (Node 3) are labeled ((N0)2) and ((N0)3), respectively, to indicate that they are direct child nodes of the root node N0 at the respective second level 415 and third level 420. Additionally, the networked node 130 (Node 5) is labeled (((N0)1)2) to indicate that it is a direct child node of the node ((N0)1) at the second level 415, while also being an indirect child of the root node N0 associated through the node ((N0)1). Similarly, the networked node 135 (Node 6) is labeled (((N0)1)3) to indicate that it is a direct child node of the node ((N0)1) at the third level 420, while also being an indirect child of the root node N0 associated through the node ((N0)1). Additionally, the networked node 124 (Node 4) is labeled (((N0)2)3) to indicate that it is a direct child node of the node ((N0)2) at the third level 420, while also being an indirect child of the root node N0 associated through the node ((N0)2). Finally, the networked node 140 (Node 7) is labeled ((((N0)1)2)3) to indicate that it is a direct child node of the node (((N0)1)2) at the third level 420, while also being an indirect child of the node ((N0)1) associated through the node (((N0)1)2), as well as an indirect child node of the root node N0 associated through the nodes ((N0)1) and (((N0)1)2).

An example configuration procedure to configure the networked nodes 105-140 of the example process control system 100 of FIG. 1 to form the example sequential synchronization hierarchy 400 of FIG. 4 is illustrated in FIGS. 5A-5G. The example configuration procedure illustrated in FIGS. 5A-5G utilizes distributed configuration in which each networked node that is configured to operate as a parent node is responsible for configuring only a portion of the sequential synchronization hierarchy, for example, only the portion including any directly associated child nodes. At a high level, the example configuration procedure configures a synchronization hierarchy, such as the sequential synchronization hierarchy 400, as follows. Initially, a node is assigned to be a root node. Then, the root node iteratively (i) selects a node from an obtained list of remaining available nodes and (ii) assigns a subset (e.g., half) of the remaining available nodes included the list to be descendents of the newly selected node. At each pass of the iterative configuration, the root node sends the selected node a configuration message to draft the selected node to be a direct child node associated directly with the root node at a next available hierarchical synchronization level in the synchronization hierarchy. The configuration message also causes the selected node to treat the root node as its sole parent node. Additionally, the configuration message includes the subset of remaining available nodes selected to be a set of descendent nodes of the newly configured direct child node. This information allows the newly configured direct child node to configure its own descendents. The root node completes this process until its list of remaining available nodes is exhausted.

In parallel (e.g., simultaneously) with the root node's configuration of its own direct children, each node selected by the root node to be a direct child configures its own respective children in a similar, iterative manner. For example, as mentioned above, at each pass of the iterative configuration, the root node selects a node from a list of remaining available nodes and sends a configuration message to draft the particular selected node to be a direct child node of the root node. The configuration message also includes a subset of remaining available nodes selected to be a set of descendent nodes of the newly configured direct child node. Upon receipt of the selected set of descendent nodes, the newly configured direct child node operates as a parent node to begin iterative configuration of its own direct child nodes selected from the obtained (e.g., received) set of descendent nodes. In particular, at each pass of the iterative configuration, a particular parent node (i) selects a node from its obtained list of remaining descendent nodes to be a direct child node and (ii) assigns a subset (e.g., half) of the remaining descendent nodes included the list to be descendents of the newly selected direct child node. Like the root node's operation, the particular parent node then sends the selected node a configuration message to draft the selected node to be a direct child node associated directly with the parent node at a next available hierarchical synchronization level (relative to the particular parent node). The configuration message also includes the selected set of descendent nodes for this newly configured direct child node to allow the direct child node to then configure its own descendents. This iterative configuration procedure continues until all networked nodes have been included in the synchronization hierarchy.

Figure 5A:
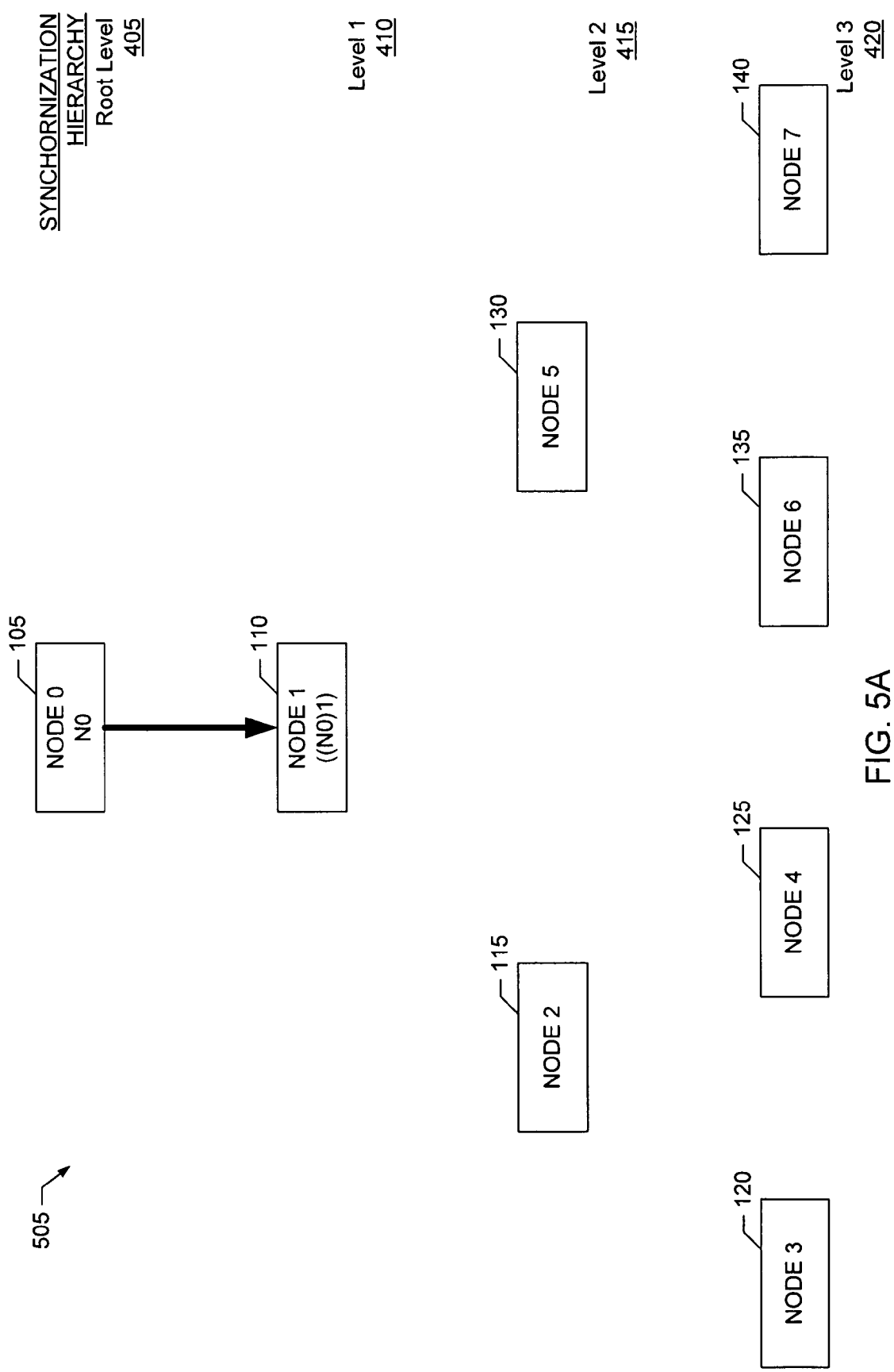
FIGS. 5A-5G collectively illustrate an example procedure to configure the example sequential synchronization hierarchy of FIG. 4.

Turning to FIG. 5A, the illustrated example configuration procedure performed on the example process control system 100 begins with a first configuration iteration 505 during which the networked node 105 (Node 0), selected to be the root node and labeled N0, configures the networked node 110 (Node 1) for inclusion in the example sequential synchronization hierarchy 400. In particular, the root node 105 (Node 0→N0) configures the node 110 (Node 1) to be its direct child node at the first hierarchical synchronization level 410, thus causing the node 110 (Node 1) to be labeled ((N0)1). In the following, a right arrow (→) represents that a network node has been assigned to the example synchronization hierarchy 400 as indicated by the label provided after the arrow. Further aspects of the configuration performed during the first iteration 505 are illustrated in FIG. 5B.

Figure 5B:
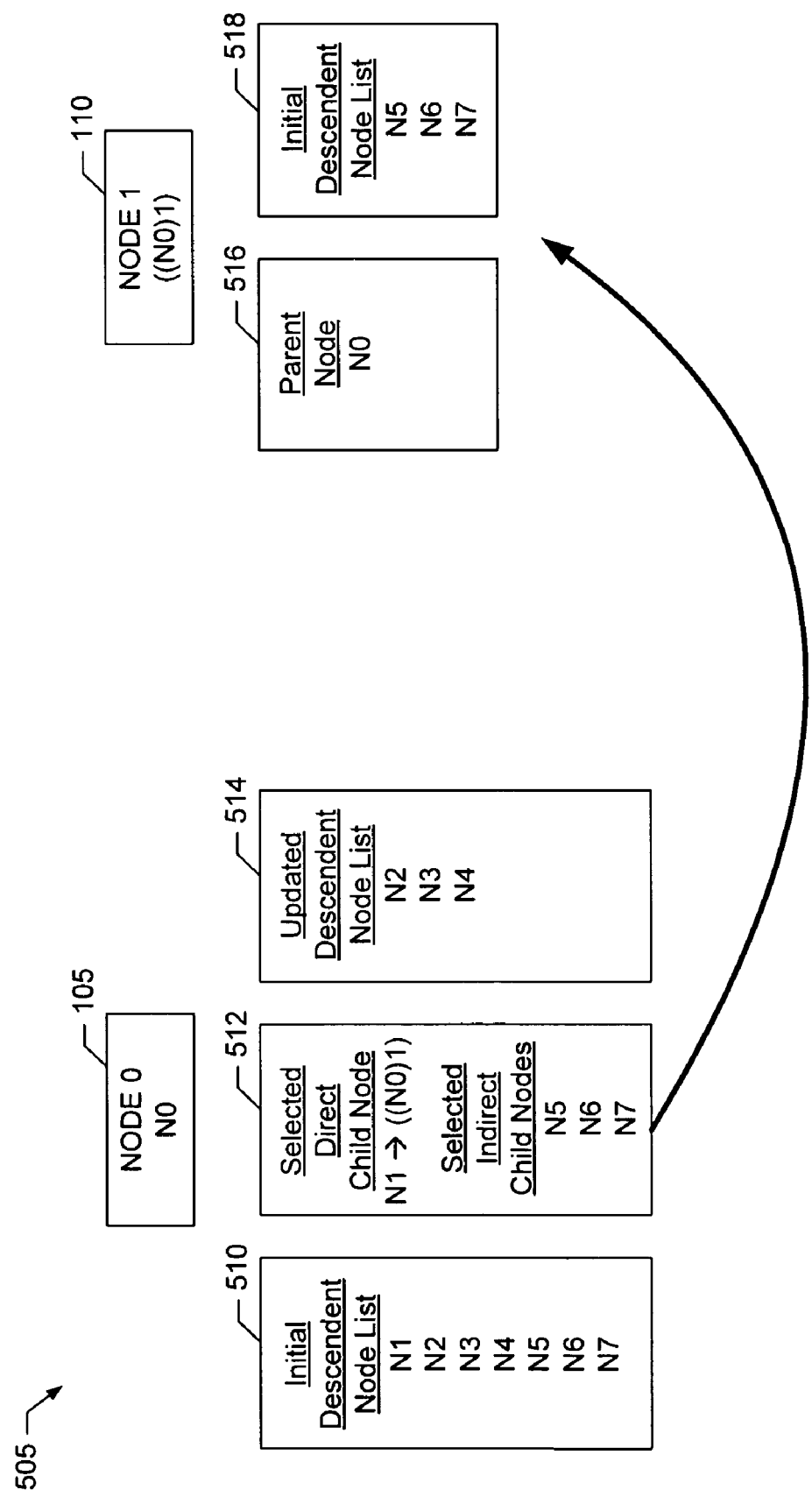

As shown in FIG. 5B, the root node 105 (Node 0→N0) obtains a list remaining available nodes to configure in the form of an initial descendent node list 510. During the first configuration iteration 505, the initial descendent node list 510 includes a list of all the other networked nodes 110-140 (e.g., labeled N1-N7, respectively) in the example process control system 100 and may be obtained via network configuration information stored and/or accessible by the root node 105 (Node 0→N0), via an input by a user, etc. The root node 105 (Node 0→N0) then forms a selection list 512 selecting the node 110 (Node 1) to be its direct child node at the first level 410 (represented as ((N0)1)), and also selecting a subset (e.g., half) of the remaining nodes in initial descendent node list 510 to be a set of descendents (e.g., N5-N7) associated with the selected child node 110 (Node 1→((N0)1)). These selected nodes are then removed from the initial descendent node list 510 to form an updated descendent node list 514 (e.g., N2-N4) associated with the root node 105 (Node 0→N0).

Also during the first configuration iteration 505, the root node 105 (Node 0→N0) sends a configuration message to the selected child node 110 (Node 1→((N0)1)) causing the child node 110 to recognize the root node 105 as its sole parent node. As such, the selected child node 110 (Node 1→((N0)1)) stores an identifier of the root node 105 (Node 0→N0) in a parent node configuration element 516. The configuration message from the root node 105 (Node 0→N0) also includes the set of descendents (e.g., N5-N7) selected for association with the child node 110 (Node 1→((N0)1)). Accordingly, the child node 110 (Node 1→((N0)1)) stores the received set of descendents (e.g., N5-N7) in its own initial descendent list 518. Thus, at the end of the first configuration iteration 505, the node assigned to the first level 410 (e.g., the node 110) is ready to begin receiving information (e.g., one or more data files) undergoing synchronization from its respective parent node (e.g., the node 105).

Figure 5C:
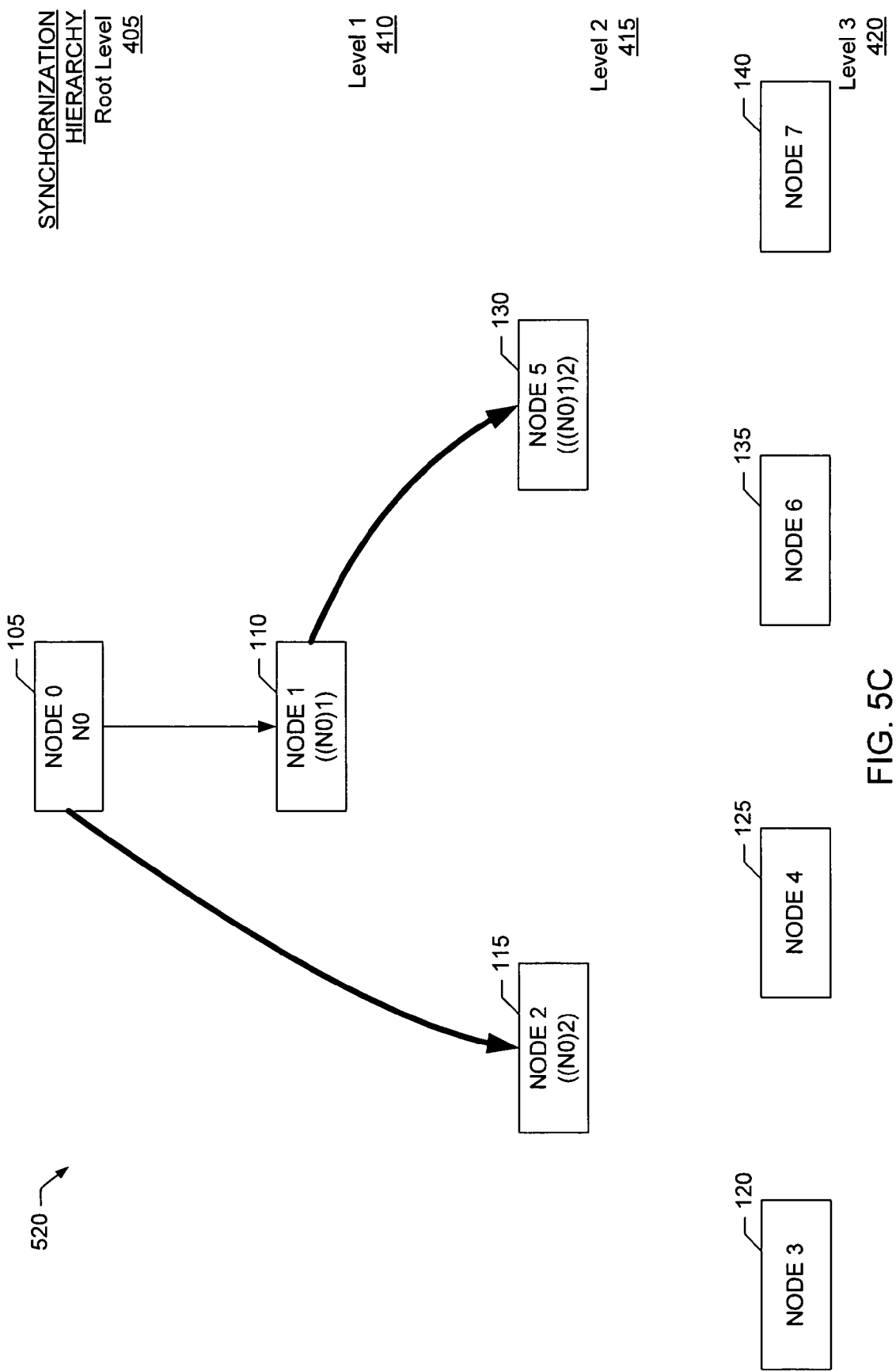

Next, during a second configuration iteration 520 illustrated in FIG. 5C, the root node 105 (Node 0→N0) configures the networked node 115 (Node 2) for inclusion in the example sequential synchronization hierarchy 400, while at substantially the same time the node 110 (Node 1→((N0)1)) configures the networked node 130 (Node 5) for inclusion in the example sequential synchronization hierarchy 400. In particular, the root node 105 (Node 0→N0) configures the node 115 (Node 2) to be its direct child node at the second hierarchical synchronization level 415, thus causing the node 115 (Node 2) to be labeled ((N0)2). Additionally, the node 110 (Node 1→((N0)1)) configures the node 130 (Node 5) to be its direct child node at the second hierarchical synchronization level 415, thus causing the node 130 (Node 5) to be labeled (((N0)1)2). Further aspects of the configuration performed during the second iteration 520 are illustrated in FIG. 5D.

Figure 5D:
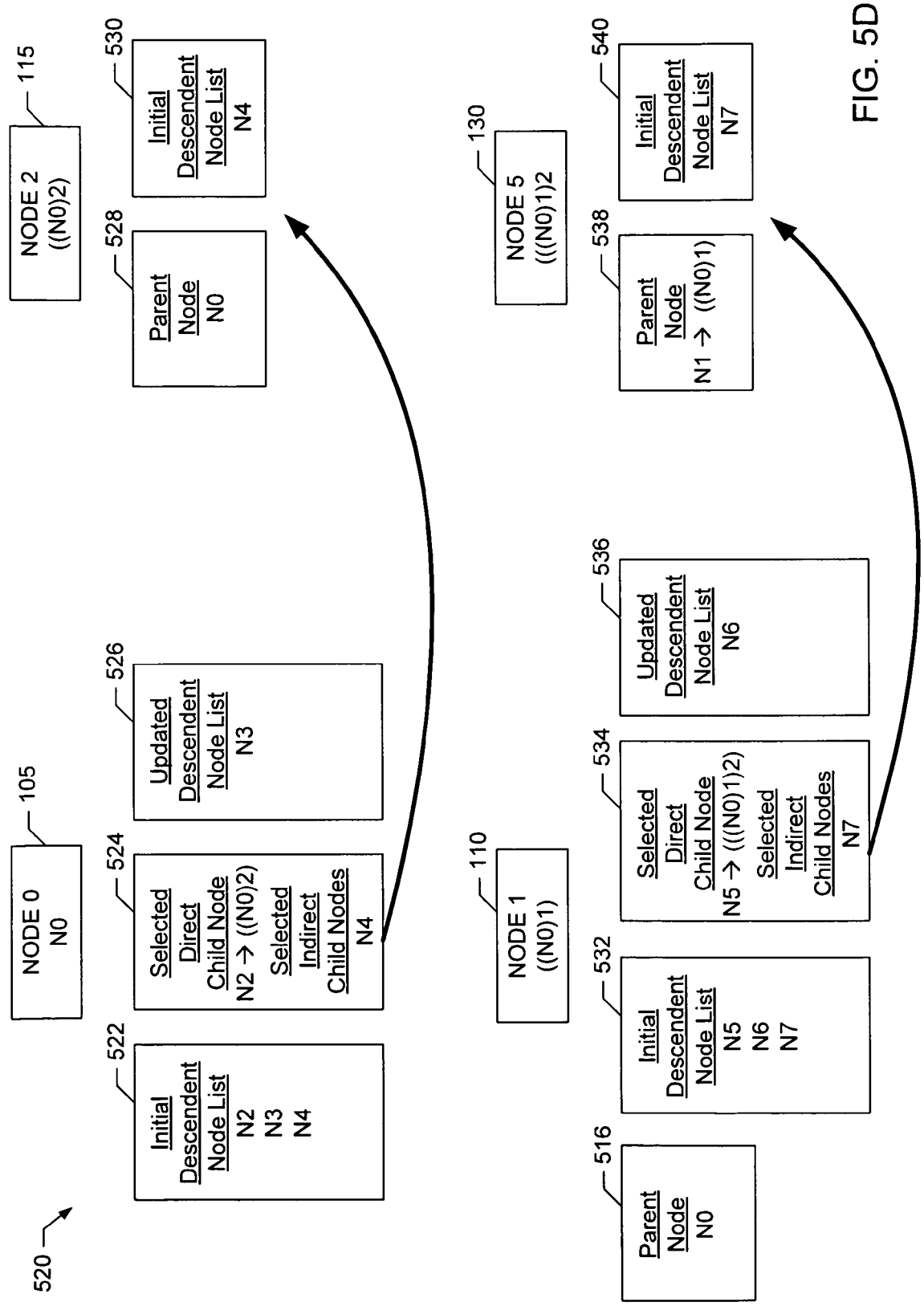

As shown in FIG. 5D, during the second configuration iteration 520, the root node 105 (Node 0→N0) has an initial descendent node list 522 corresponding to the updated descendent node list 514 created during the first configuration iteration 505. The initial descendent node list 522 includes a list of remaining networked nodes (e.g., N2-N4) to be configured by the root node 105 (Node 0→N0). The root node 105 (Node 0→N0) then forms a selection list 524 by selecting the node 115 (Node 2) to be its direct child node at the second level 415 (represented as ((N0)2)), and also selecting a subset (e.g., half) of the remaining nodes in initial descendent node list 522 to be a set of descendents (e.g., N4) associated with the selected child node 115 (Node 2→((N0)2)). These selected nodes are then removed from the initial descendent node list 522 to form an updated descendent node list 526 (e.g., N3) associated with the root node 105 (Node 0→N0). Additionally, the root node 105 (Node 0→N0) sends a configuration message to the selected child node 115 (Node 2→((N0)2)) causing the child node 115 to recognize the root node 105 as its sole parent node. As such, the selected child node 115 (Node 2→((N0)2)) stores an identifier of the root node 105 (Node 0→N0) in a parent node configuration element 516. Furthermore, the child node 115 (Node 2→((N0)2)) stores the set of descendents (e.g., N4) included in the received configuration message in its own initial descendent list 530.

Also during the second configuration iteration 520, and substantially in parallel (e.g., simultaneously) with configuration being performed by the root node 105 (Node 0→N0), the node 110 (Node 1→((N0)1)) begins its own node configuration with an initial descendent node list 532 corresponding to the descendent node list 518 created during the first configuration iteration 505. The initial descendent node list 532 includes a list of remaining networked nodes (e.g., N5-N7) to be configured by the node 110 (Node 1→((N0)1)). The node 110 (Node 1→((N0)1)) then forms a selection list 534 by selecting the node 130 (Node 5) to be its direct child node at the second level 415 (represented as (((N0)1)2)), and also selecting a subset (e.g., half) of the remaining nodes in initial descendent node list 532 to be a set of descendents (e.g., N7) associated with the selected child node 130 (Node 5→(((N0)1)2)). These selected nodes are then removed from the initial descendent node list 532 to form an updated descendent node list 536 (e.g., N6) associated with the node 110 (Node 1→((N0)1)). Additionally, the node 110 (Node 1→((N0)1)) sends a configuration message to the selected child node 130 (Node 5→(((N0)1)2)) causing the child node 130 to recognize the node 110 as its sole parent node. As such, the selected child node 130 (Node 5→(((N0)1)2)) stores an identifier of the node 110 (Node 1→((N0)1)) in a parent node configuration element 538. Furthermore, the child node 130 (Node 5→(((N0)1)2)) stores the set of descendents (e.g., N7) included in the received configuration message in its own initial descendent list 540.

Thus, at the end of the second configuration iteration 520, the node(s) assigned to the second level 415 (e.g., the nodes 115 and 130) are ready to begin receiving information (e.g., data file(s)) undergoing synchronization from their respective parent nodes (e.g., the nodes 105 and 110, respectively).

Figure 5E:
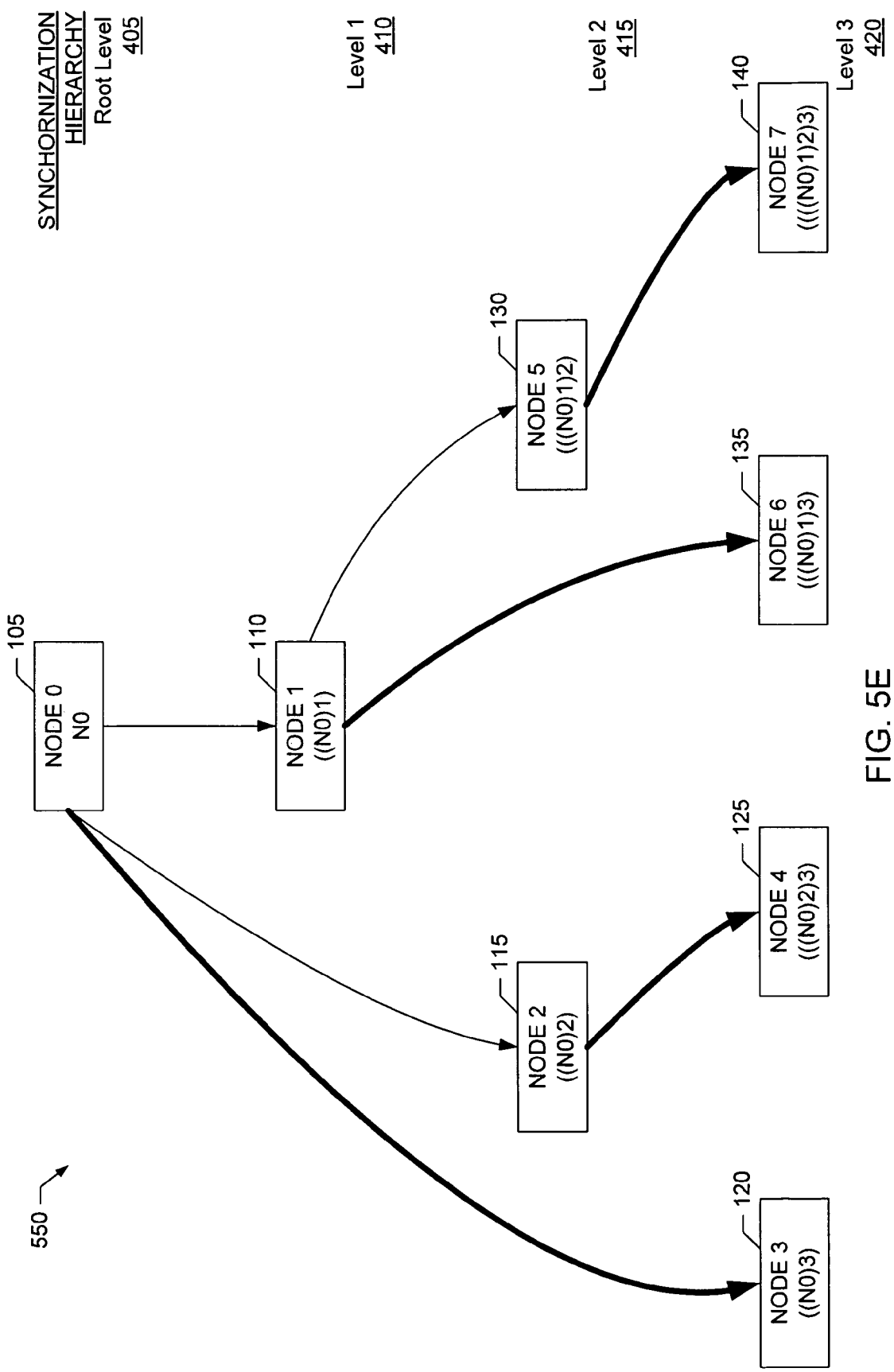

Finally, during a third configuration iteration 550 illustrated in FIG. 5E, the root node 105 (Node 0→N0) configures the networked node 120 (Node 3) for inclusion in the example sequential synchronization hierarchy 400, while at substantially the same time the nodes 110 (Node 1→((N0)1)), 115 (Node 2→((N0)2)) and 130 (Node 5→(((N0)1)2)) configure, respectively, the networked nodes 135 (Node 6), 125 (Node 4) and 140 (Node 7) for inclusion in the example sequential synchronization hierarchy 400. In particular, the root node 105 (Node 0→N0) configures the node 120 (Node 3) to be its direct child node at the third hierarchical synchronization level 420, thus causing the node 120 (Node 3) to be labeled ((N0)3). Additionally, the node 110 (Node 1→((N0)1)) configures the node 135 (Node 6) to be its direct child node at the third hierarchical synchronization level 420, thus causing the node 135 (Node 6) to be labeled (((N0)1)3). Similarly, the node 115 (Node 2→((N0)2)) configures the node 125 (Node 4) to be its direct child node at the third hierarchical synchronization level 420, thus causing the node 125 (Node 4) to be labeled (((N0)2)3). Furthermore, the node 130 (Node 5→(((N0)1)2)) configures the node 140 (Node 7) to be its direct child node at the third hierarchical synchronization level 420, thus causing the node 140 (Node 7) to be labeled ((((N0)1)2)3). Further aspects of the configuration performed during the third iteration 550 are illustrated in FIGS. 5F-5G.

Figure 5F:
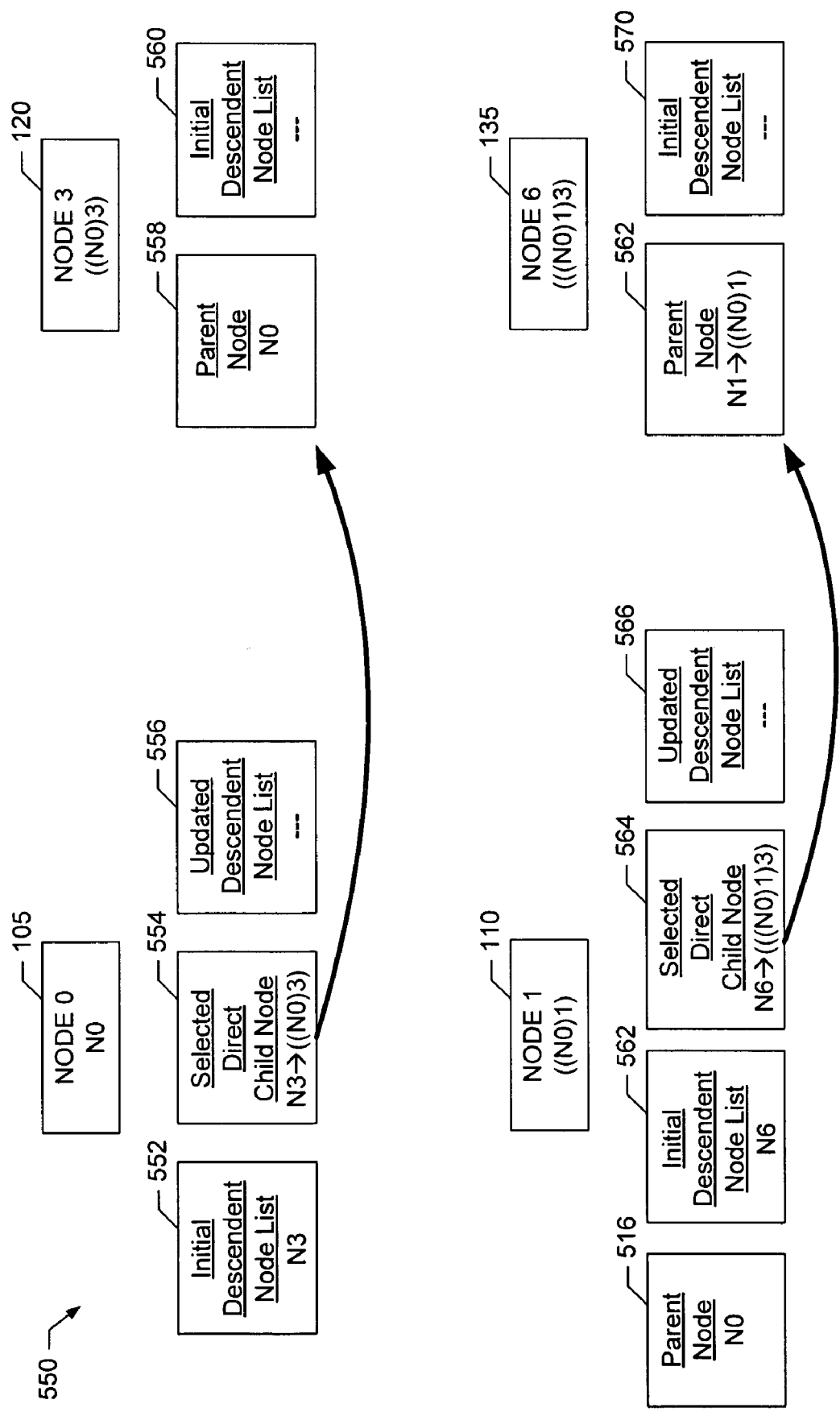

As shown in FIG. 5F, during the third configuration iteration 550, the root node 105 (Node 0→N0) has an initial descendent node list 552 corresponding to the updated descendent node list 526 created during the second configuration iteration 520. The initial descendent node list 552 includes a list of remaining networked nodes (e.g., N3) to be configured by the root node 105 (Node 0→N0). The root node 105 (Node 0→N0) then forms a selection list 554 by selecting the node 120 (Node 3) to be its direct child node at the third level 420 (represented as ((N0)3)). Also, the root node 105 (Node 0→N0) determines that there are no remaining nodes that can be selected to be descendent nodes of the selected child node 120 (Node 3→((N0)3)). The selected node is then removed from the initial descendent node list 552 to form an updated descendent node list 556 containing no more remaining nodes (indicating that the root node's iterative configuration will end with this iteration). Additionally, the root node 105 (Node 0→N0) sends a configuration message to the selected child node 120 (Node 3→((N0)3)) causing the child node 120 to recognize the root node 105 as its sole parent node. As such, the selected child node 120 (Node 3→((N0)3)) stores an identifier of the root node 105 (Node 0→N0) in a parent node configuration element 558. Furthermore, the child node 120 (Node 3→((N0)3)) has no associated descendent nodes and, thus, its own initial descendent list 560 remains empty (indicating that the child node 120 is a leaf node of the example synchronization hierarchy 400).

Also during the third configuration iteration 550, and substantially in parallel (e.g., simultaneously) with configuration being performed by the root node 105 (Node 0→N0), the node 110 (Node 1→((N0)1)) begins its own node configuration with an initial descendent node list 562 corresponding to the descendent node list 536 created during the second configuration iteration 520. The initial descendent node list 562 includes a list of remaining networked nodes (e.g., N6) to be configured by the node 110 (Node 1→((N0)1)). The node 110 (Node 1→((N0)1)) then forms a selection list 564 by selecting the node 135 (Node 6) to be its direct child node at the third level 420 (represented as (((N0)1)3)). Also, the node 110 (Node 1→((N0)1)) determines that there are no remaining nodes that can be selected to be descendent nodes of the selected child node 135 (Node 6→(((N0)1)3)). The selected node is then removed from the initial descendent node list 562 to form an updated descendent node list 566 containing no more remaining nodes (indicating that this node's iterative configuration will end with this iteration). Additionally, the node 110 (Node 1→((N0)1)) sends a configuration message to the selected child node 135 (Node 6→(((N0)1)3)) causing the child node 135 to recognize the node 110 as its sole parent node. As such, the selected child node 135 (Node 6→(((N0)1)3)) stores an identifier of the node 110 (Node 1→((N0)1)) in a parent node configuration element 568. Furthermore, the child node 135 (Node 6→(((N0)1)3)) has no associated descendent nodes and, thus, its own initial descendent list 570 remains empty (indicating that the child node 135 is a leaf node of the synchronization hierarchy 400).

Figure 5G:
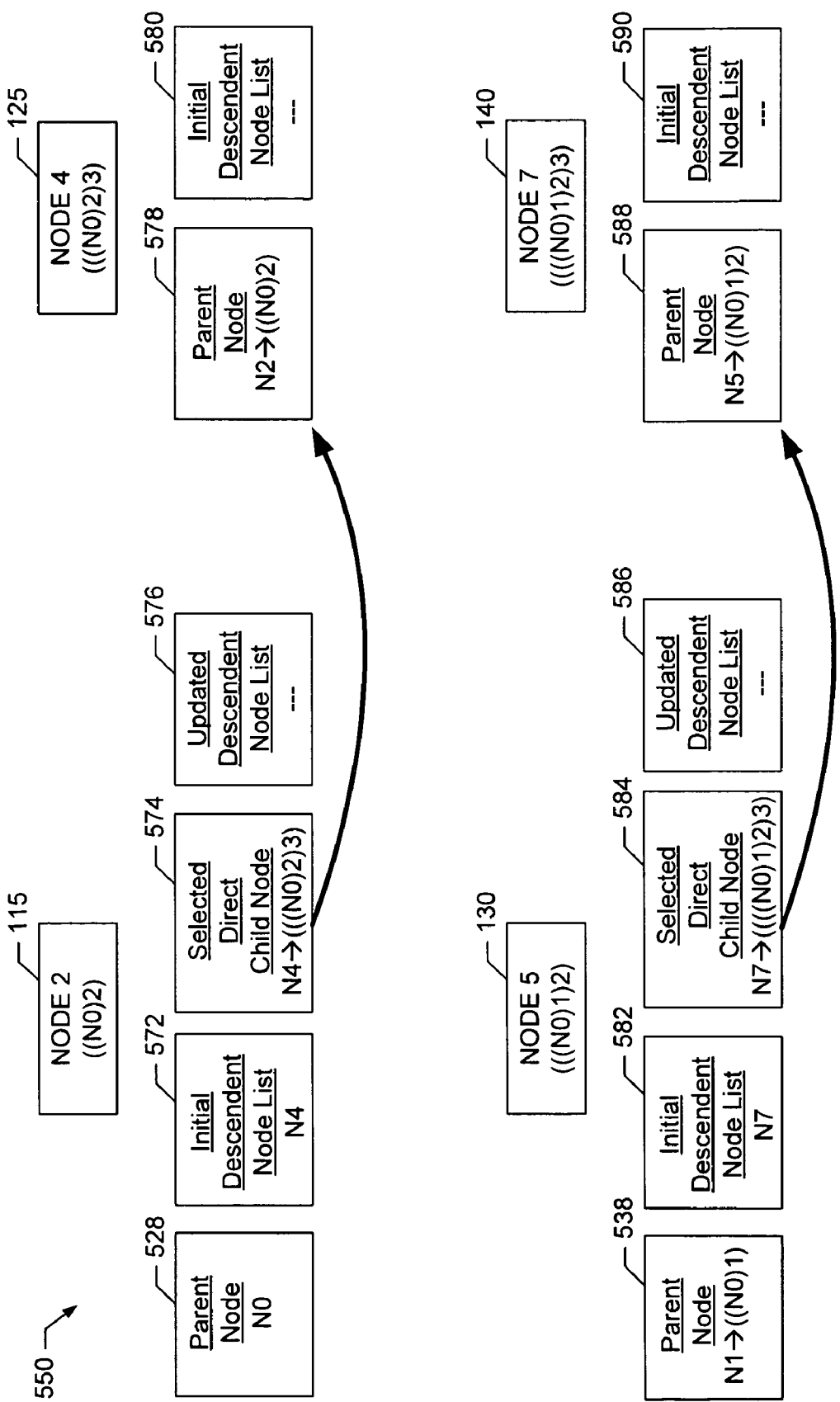

Turning to FIG. 5G, during the third configuration iteration 550, and substantially in parallel (e.g., simultaneously) with configuration being performed by the root node 105 (Node 0→N0) and the node 110 (Node 1→((N0)1)), the node 115 (Node 2→((N0)2)) begins its own node configuration with an initial descendent node list 572 corresponding to the descendent node list 530 created during the second configuration iteration 520. The initial descendent node list 572 includes a list of remaining networked nodes (e.g., N4) to be configured by the node 115 (Node 2→((N0)2)). The node 115 (Node 2→((N0)2)) then forms a selection list 574 by selecting the node 125 (Node 4) to be its direct child node at the third level 420 (represented as (((N0)2)3)). Also, the node 115 (Node 2→((N0)2)) determines that there are no remaining nodes that can be selected to be descendent nodes of the selected child node 125 (Node 4→(((N0)2)3)). The selected node is then removed from the initial descendent node list 572 to form an updated descendent node list 576 containing no more remaining nodes (indicating that this node's iterative configuration will end with this iteration). Additionally, the node 115 (Node 2→((N0)2)) sends a configuration message to the selected child node 125 (Node 4→(((N0)2)3)) causing the child node 125 to recognize the node 115 as its sole parent node. As such, the selected child node 125 (Node 4→(((N0)2)3)) stores an identifier of the node 115 (Node 2→((N0)2)) in a parent node configuration element 578. Furthermore, the child node 125 (Node 4→(((N0)2)3)) has no associated descendent nodes and, thus, its own initial descendent list 580 remains empty (indicating that the child node 125 is a leaf node of the synchronization hierarchy 400).

Also during the third configuration iteration 550, and substantially in parallel (e.g., simultaneously) with configuration being performed by the root node 105 (Node 0→N0), the node 110 (Node 1→((N0)1)) and the node 115 (Node 2→((N0)2)), the node 130 (Node 5→(((N0)1)2)) begins its own node configuration with an initial descendent node list 582 corresponding to the descendent node list 540 created during the second configuration iteration 520. The initial descendent node list 582 includes a list of remaining networked nodes (e.g., N7) to be configured by the node 130 (Node 5→(((N0)1)2)). The node 130 (Node 5→(((N0)1)2)) then forms a selection list 584 by selecting the node 140 (Node 7) to be its direct child node at the third level 420 (represented as ((((N0)1)2)3)). Also, the node 130 (Node 5→(((N0)1)2)) determines that there are no remaining nodes that can be selected to be descendent nodes of the selected child node 140 (Node 7→((((N0)1)2)3)). The selected node is then removed from the initial descendent node list 582 to form an updated descendent node list 586 containing no more remaining nodes (indicating that this node's iterative configuration will end with this iteration). Additionally, the node 130 (Node 5→(((N0)1)2)) sends a configuration message to the selected child node 140 (Node 7→((((N0)1)2)3)) causing the child node 140 to recognize the node 130 as its sole parent node. As such, the selected child node 140 (Node 7→((((N0)1)2)3)) stores an identifier of the node 130 (Node 5→(((N0)1)2)) in a parent node configuration element 588. Furthermore, the node 140 (Node 7→((((N0)1)2)3)) has no associated descendent nodes and, thus, its own initial descendent list 590 remains empty (indicating that the child node 140 is a leaf node of the synchronization hierarchy 400).

Thus, at the end of the third configuration iteration 550, the node(s) assigned to the third level 420 (e.g., the nodes 120, 125, 135 and 140) are ready to begin receiving information (e.g., data file(s)) undergoing synchronization from their respective parent nodes (e.g., the nodes 105, 115, 110 and 130, respectively). Moreover, in the illustrated example, configuration of the example synchronization hierarchy 400 is complete at the end of the third configuration iteration 550, with the nodes assigned to the corresponding third hierarchical synchronization level 420 forming the leaf nodes of the hierarchy.

Figure 6:
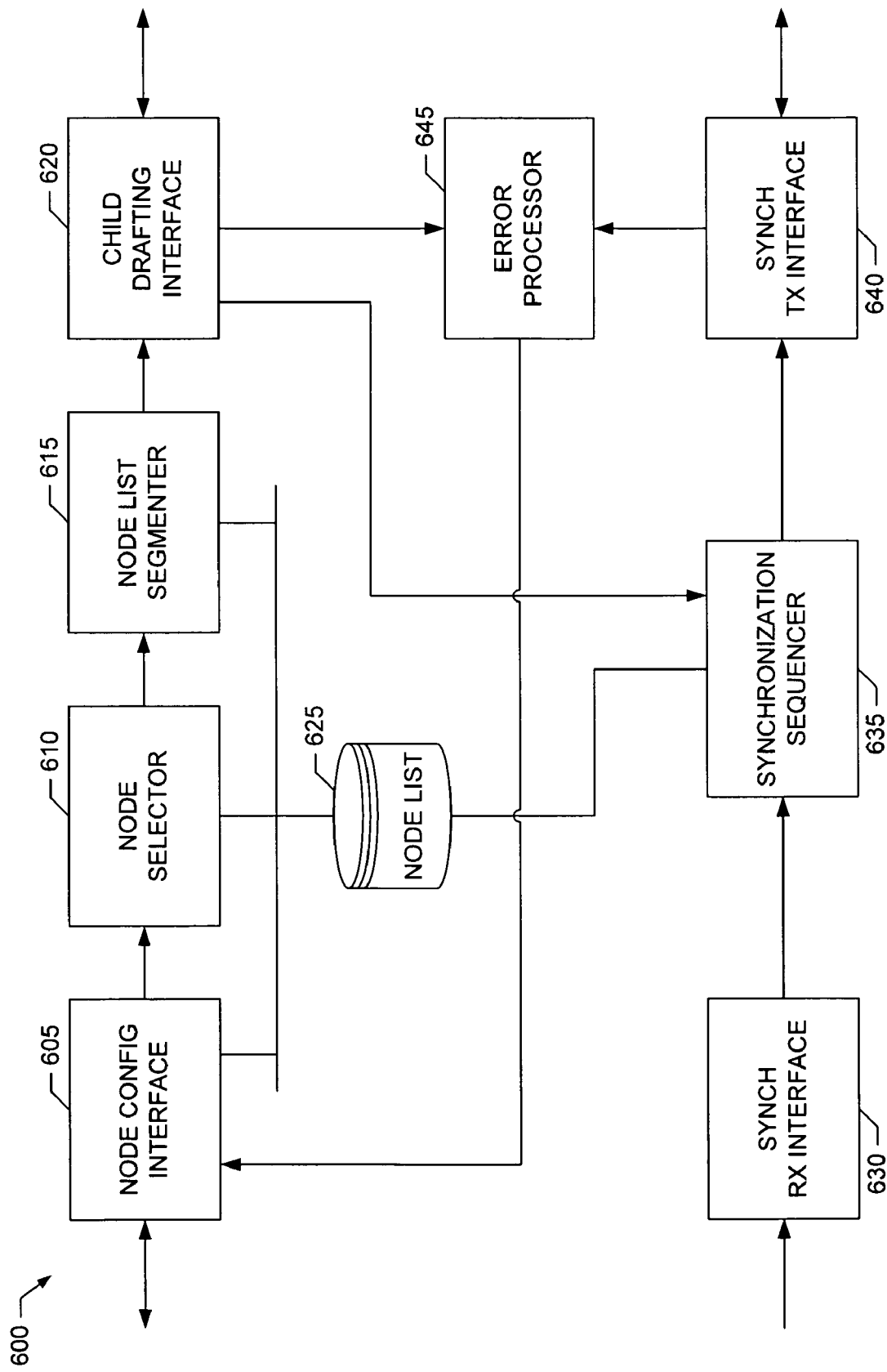
FIG. 6 is a block diagram of an example information synchronizer that may be used to implement the example sequential synchronization hierarchy of FIG. 4.

A block diagram of an example information synchronizer 600 that may be used in the example process control system 100 of FIG. 1 to implement the example sequential synchronization hierarchy 400 of FIG. 4 is illustrated in FIG. 6. The example information synchronizer 600 supports configuration of at least portions of the example sequential synchronization hierarchy 400, as well as propagation of information (e.g., one or more data files) to perform synchronization in the example sequential synchronization hierarchy 400. Furthermore, the information synchronizer 600 of the illustrated example is intended for implementation and/or use by one or more of the example networked nodes 105-140 of the example process control system 100.

Turning to FIG. 6, to support configuration of at least portions of the example sequential synchronization hierarchy 400, the example information synchronizer 600 includes a node configuration interface 605, a node selector 610, a node list segmenter 615, a child drafting interface 620 and a node list storage unit 625. The example node configuration interface 605 is configured to obtain a list of the set of descendent networked nodes (also referred to herein as a "descendent node list") to be associated with a particular one of the networked nodes 105-140 of the example process control system 100. For example, if the example information synchronizer 600 is configured to support (e.g., is implemented and/or configured for use by) the root node 105 (Node 0→N0), then the example node configuration interface 605 may be configured to obtain the descendent node list based on available network configuration, a user input, etc. If, however, the example information synchronizer 600 is configured to support the node 110 (Node 1→((N0)1)), then the example node configuration interface 605 may be configured to obtain the descendent node list from a configuration message sent by node 110's associated parent node, that is, the root node 105 (Node 0→N0). Regardless of how the descendent node list is obtained, the example node configuration interface 605 is configured to store the descendent node list in the example node list storage unit 625.

The example node selector 610 is configured to select one or more direct child nodes from the descendent node list stored in the example node list storage unit 625 to receive the information undergoing synchronization directly from the particular networked node supported by the example information synchronizer 600. In an example implementation, for an associated parent node, the node selector 610 iteratively selects individual nodes from the descendent node list to be a direct child node, and waits for configuration of the selected direct child node to complete before selecting another direct child node from an updated version of the descendent node list. After the one or more direct child nodes are selected, the example node selector 610 updates the descendent node list stored in the example node list storage unit 625 by removing the node selected to be a direct child of the particular node (e.g., operating as a parent node) supported by the example information synchronizer 600.

The example information synchronizer 600 also includes the example node list segmenter 615 to select one or more sets of indirect child nodes from the descendent node list stored in the example node list storage unit 625 to be associated indirectly with the particular networked node supported by the example information synchronizer 600. In an example implementation, the node list segmenter 615 is configured to iteratively select a portion (e.g., half) of the nodes remaining in the descendent node list to be the set of indirect child nodes to receive the information undergoing synchronization through the respective direct child node selected by the node selector 610 during the same or a previous iteration. In this way, the information undergoing synchronization is to be received by the set of indirect child nodes indirectly through the selected direct child node instead of directly from the networked node supported by the example information synchronizer 600. After the one or more sets of indirect child nodes are selected, the example node list segmenter 615 updates the descendent node list stored in the example node list storage unit 625 by removing the node(s) included in the one or more selected sets of indirect child nodes.

The example child drafting interface 620 operates to configure each of the direct child nodes selected by the node selector 610 to receive the information undergoing synchronization directly from the networked node (e.g., operating as a parent node) supported by the example information synchronizer 600. Additionally, the child drafting interface 620 operates to provide the direct child node undergoing configuration with the corresponding set of indirect child nodes selected by the example node list segmenter 615. For example, the child drafting interface 620 may send a configuration message to the direct child node currently selected by the example node selector 610 that includes the list of indirect nodes currently selected by the example node list segmenter 615. Upon receipt, such a configuration message can cause the receiving direct child node to treat the sending networked node as its parent node. Additionally, the newly configured direct child node can begin configuring the received set of indirect child nodes to receive the information undergoing synchronization through the newly configured direct child node.

As discussed above, the example node list storage unit 625 is configured to store the descendent node list for the networked node supported by the example information synchronizer 600. The example node list storage unit 625 may be implemented by any type of storage device, memory element, etc. Furthermore, the example node list storage unit 625 may store the descendent node list in any appropriate format, such as, for example, a database, linked list, array of elements, etc.

To support the synchronization of information (e.g., such as one or more data/configuration files) according to the example sequential synchronization hierarchy 400, the example information synchronizer 600 includes a synchronized data receive interface 630, a synchronization sequencer 635 and a synchronized data transmit interface 640. The example synchronized data receive interface 630 is configured to receive the information undergoing synchronization for processing by the networked node supported by the example information synchronizer 600. The received information may be in the form of one or more received data (e.g., configuration) files, one or more data packets, one or more data inputs, etc. For example, if the example information synchronizer 600 is configured to support (e.g., is implemented and/or configured for use by) the root node 105 (Node 0→N0), then the example synchronized data receive interface 630 may be configured to receive the information undergoing synchronization as data entries and/or a data (e.g., configuration) file updated by a user. If, however, the example information synchronizer 600 is configured to support the node 110 (Node 1→((N0)1)), then the example synchronized data receive interface 630 may be configured to receive the information undergoing synchronization from the parent node of node 110, that is, the root node 105 (Node 0→N0). Regardless of how the data undergoing synchronization is to be received by the example receive interface 630, the received information is synchronized according to the example synchronization sequencer 635.

In the illustrated example, the synchronization sequencer 635 is configured to schedule propagation of the information received by the example synchronized data receive interface 630 sequentially to each direct child node of the parent node supported by the example information synchronizer 600. As discussed above, in an example implementation, each direct child node of a particular parent node in the example synchronization hierarchy 400 is assigned to a unique hierarchical synchronization level. Thus, in such an example implementation, the synchronization sequencer 635 can be configured to schedule sequential propagation of the information to each direct child based on the unique hierarchical synchronization level to which the direct child is assigned. For example, the synchronization sequencer 635 may schedule information propagation by selecting direct child nodes of a supported parent node sequentially in descending order of priority as defined by the unique set of hierarchical synchronization levels to which the direct child nodes are assigned. In other words, in such an example implementation, the synchronization sequencer 635 is to schedule sending the information undergoing synchronization to a first direct child node associated with a first hierarchical synchronization level before sending the information to a second direct child node associated with a second hierarchical synchronization level having a lower priority than the first hierarchical synchronization level.

Additionally, the synchronization sequencer 635 of the illustrated example is configured to schedule sending the information undergoing synchronization to a direct child node provided it has been configured (e.g., drafted) successfully by the example child drafting interface 620 regardless of whether the direct child node has completed configuring (e.g., drafting) its own associated child nodes for inclusion in the example synchronization hierarchy 400. In this way, the example synchronization sequencer 635 can schedule information for propagation to a direct child node even though configuration/formation of the entire example synchronization hierarchy 400 is not yet complete. Furthermore, the example synchronization sequencer 635 is configured to operate autonomously to schedule propagation of information to each direct child node regardless of the information propagation being performed by any other nodes configured to operate as parent nodes in the example synchronization hierarchy 400. For example, assume that a first instance of the example synchronization sequencer 635 supporting a first configured parent node schedules sending of the information undergoing synchronization to a first direct child node. Then, because each example synchronization sequencer 635 operates autonomously, the first instance of the example synchronization sequencer 635 may schedule sending of the information undergoing synchronization to a second direct child node of the supported first parent node while a second instance of the example synchronization sequencer 635 supporting the first direct child node is resending the received information undergoing synchronization to its own direct child node(s). In other words, the synchronization sequencer 635 of the illustrated example supports simultaneous synchronization of information along several parent-child sequential propagation paths.

The example information synchronizer 600 also includes the synchronized data transmit interface 640 to transmit the information undergoing synchronization to one or more direct child nodes as scheduled by the example synchronization sequencer 635. For example, the synchronized data transmit interface 640 may transmit the information undergoing synchronization in the form of one or more received data (e.g., configuration) files, one or more data packets, etc., according to any standard and/or proprietary data transmission protocol.

The example information synchronizer 600 also includes an error processor 645. The error processor 645 of the illustrated example is configured to support both the hierarchy configuration and the information synchronization aspects of the example information synchronizer 600. For example, the error processor 645 can be configured to determine whether a configuration (e.g., drafting) message sent by the example child drafting interface 620 was received and acknowledged by the intended recipient node. If the configuration (e.g., drafting) message is acknowledged as being received, the error processor 645 can determine that the recipient node was properly configured to be a direct child of the parent node supported by the example information synchronizer 600, and that any set of indirect child nodes included in the configuration (e.g., drafting) message was received successfully by the direct child node. However, if the configuration (e.g., drafting) message is not acknowledged, then the error processor 645 can determine that configuration of the intended recipient node was unsuccessful and/or the recipient node did not receive the set of indirect child nodes successfully.

In the latter case, the error processor 645 can use the lack of an acknowledgment to further determine that the intended recipient node has been removed from the example process control system 100 and, thus, any associated descendent nodes of the removed node need to be reconfigured to be descendents of the root node as discussed in detail above. In the case in which the example information sequencer 600 supports the root node 105 (Node 0→N0) of the example synchronization hierarchy 400, a determination by the example error processor 645 that the intended recipient node has been removed from the system 100 may cause the descendent node list stored in the example node list storage unit 625 to be updated to include any descendent nodes of the removed node. The example information sequencer 600 may then process the updated descendent list as discussed above to reconfigure (e.g., redraft) these node(s) for inclusion in the example synchronization hierarchy 400.

The example error processor 645 also supports information synchronization by determining whether the information sent by the example synchronized data transmit interface 640 was received and acknowledged by the intended recipient node. If the sent information is acknowledged as being received, the error processor 645 can determine that the recipient node received the information undergoing synchronization properly and can continue synchronizing the information with its own child nodes. However, if the sent information is not acknowledged, then the error processor 645 can determine that information was not received successfully by the intended recipient node. In the latter case, the error processor 645 can use the lack of an acknowledgment to further determine that the intended recipient node has been removed from the example process control system 100. As discussed above, if the example error processor 645 determines that the intended recipient node has been removed from the system 100, the example error processor 645 can cause the descendent node list stored in the example node list storage unit 625 to be updated with the removed node's descendent node(s) to allow these node(s) to be reconfigured (e.g., redrafted) for inclusion in the example synchronization hierarchy 400.

While an example manner of implementing the example information synchronizer 600 has been illustrated in FIG. 6, one or more of the elements, processes and/or devices illustrated in FIG. 6 may be combined, divided, re-arranged, omitted, eliminated and/or implemented in any other way. Further, the example node configuration interface 605, the example node selector 610, the example node list segmenter 615, the example child drafting interface 620, the example node list storage unit 625, the example synchronized data receive interface 630, the example synchronization sequencer 635, the example synchronized data transmit interface 640, the example error processor 645 and/or, more generally, the example information synchronizer 600 of FIG. 6 may be implemented by hardware, software, firmware and/or any combination of hardware, software and/or firmware. Thus, for example, any of the example node configuration interface 605, the example node selector 610, the example node list segmenter 615, the example child drafting interface 620, the example node list storage unit 625, the example synchronized data receive interface 630, the example synchronization sequencer 635, the example synchronized data transmit interface 640, the example error processor 645 and/or, more generally, the example information synchronizer 600 could be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the example information synchronizer 600 of FIG. 6 may include one or more elements, processes and/or devices in addition to, or instead of, those illustrated in FIG. 6, and/or may include more than one of any or all of the illustrated elements, processes and devices.

Flowcharts representative of example processes that may be executed to implement, at least in part, the example process control system 100, the example networked nodes 105-140, the example sequential synchronization hierarchy 400, the example information synchronizer 600, the example node configuration interface 605, the example node selector 610, the example node list segmenter 615, the example child drafting interface 620, the example node list storage unit 625, the example synchronized data receive interface 630, the example synchronization sequencer 635, the example synchronized data transmit interface 640 and/or the example error processor 645 of FIG. 6 are shown in FIGS. 7, 9 and 11A-11B. In these examples, the process represented by each flowchart may be implemented by one or more programs comprising machine readable instructions for execution by: (a) a processor, such as the processor 1212 shown in the example computer 1200 discussed below in connection with FIG. 12, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1212, but the entire program or programs and/or portions thereof could alternatively be executed by a device other than the processor 1212 and/or embodied in firmware or dedicated hardware (e.g., implemented by an application specific integrated circuit (ASIC), a programmable logic device (PLD), a field programmable logic device (FPLD), discrete logic, etc.). For example, any or all of the example process control system 100, the example networked nodes 105-140, the example sequential synchronization hierarchy 400, the example information synchronizer 600, the example node configuration interface 605, the example node selector 610, the example node list segmenter 615, the example child drafting interface 620, the example node list storage unit 625, the example synchronized data receive interface 630, the example synchronization sequencer 635, the example synchronized data transmit interface 640 and/or the example error processor 645 could be implemented by any combination of software, hardware, and/or firmware. Also, some or all of the processes represented by the flowcharts of FIGS. 7, 9 and 11A-11B may be implemented manually. Further, although the example processes are described with reference to the flowcharts illustrated in FIGS. 7, 9 and 11A-11B, many other techniques for implementing the example methods and apparatus described herein may alternatively be used. For example, with reference to the flowcharts illustrated in FIGS. 7, 9 and 11A-11B, the order of execution of the blocks may be changed, and/or some of the blocks described may be changed, eliminated, combined and/or subdivided into multiple blocks.

Figure 7:
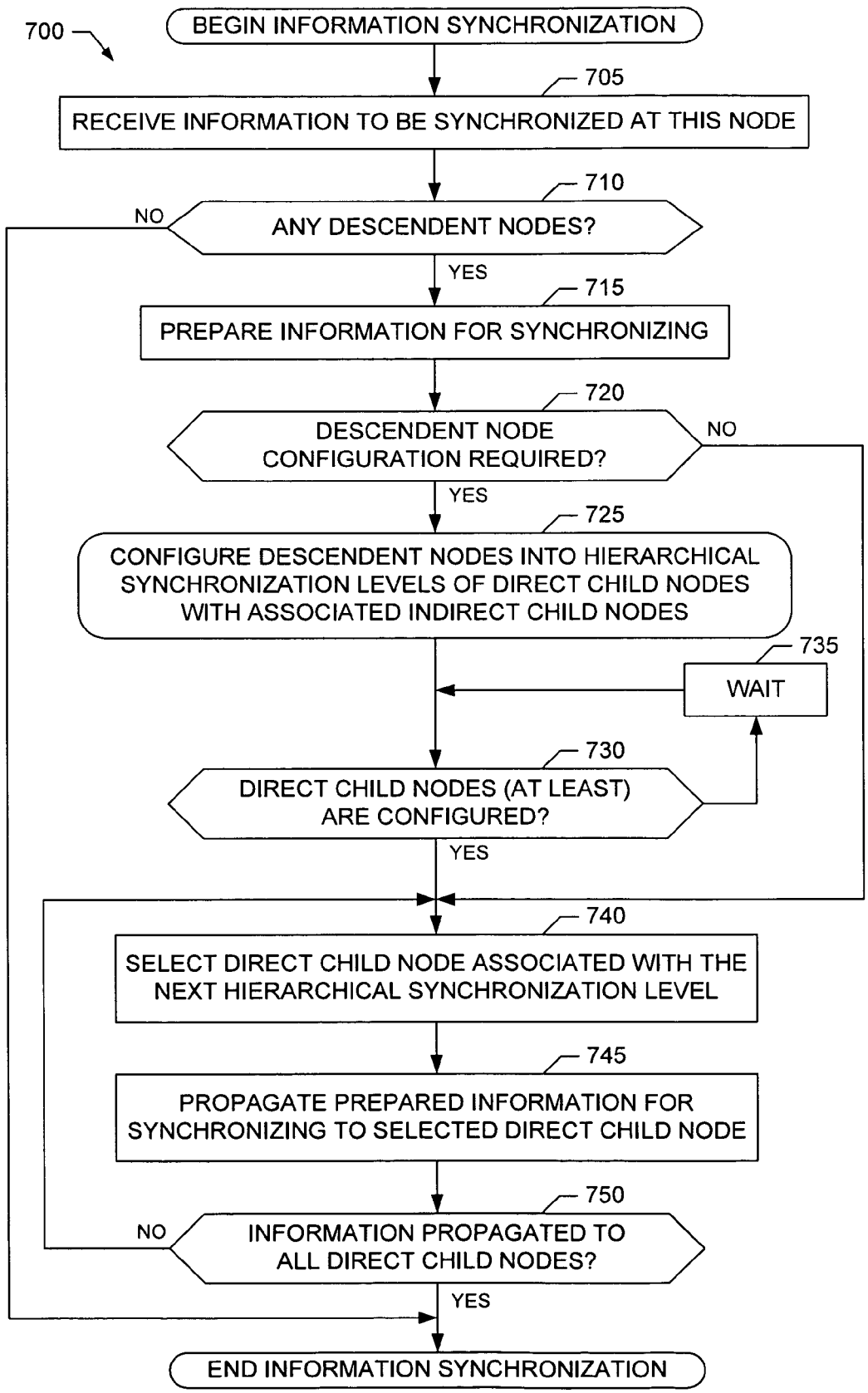
FIG. 7 is a flowchart representative of an example information synchronization process that may be performed to implement at least portions of the example information synchronizer of FIG. 6 and/or the example sequential synchronization hierarchy of FIG. 4.

An example information synchronization process 700 that may be executed to implement at least a portion of the example information synchronizer 600 of FIG. 6 to perform information synchronization among, for example, the networked nodes 105-140 of the example process control system 100 according to the example sequential synchronization hierarchy 400 is illustrated in FIG. 7. In an example implementation, an instance of the example information synchronization process 700 is executed by each of the example networked nodes 105-140 to, for example, configure the example sequential synchronization hierarchy 400 and support synchronization of data simultaneously along multiple parent-child sequential propagation paths. Without loss of generality, operation of the example information synchronization process 700 is described in the context of execution by a representative networked node, referred to hereinbelow as the "instant node," which could be, for example, any one of the example networked nodes 105-140. The example information synchronization process 700 may be executed at predetermined intervals at which receipt of information to be synchronized by the instant node is expected, based on an occurrence of a predetermined event (e.g., such as an interrupt scheduling execution of the example process 700), continuously as a background process, etc., or any combination thereof.

Turning to FIG. 7, the example information synchronization process 700 begins at block 705 at which the example information synchronizer 600 receives the information (e.g., one or more data/configuration files) to be synchronized by the instant node. For example, at block 705 the example synchronized data receive interface 630 included in the example information synchronizer 600 may receive the information undergoing synchronization. Furthermore, and as discussed above, if the instant node is the root node 105 (Node 0→N0) of the example synchronization hierarchy 400, then at block 705 the example synchronized data receive interface 630 may received the information to be synchronized as one or more input data entries and/or data (e.g., configuration) files provided by a user. Alternatively, if the instant node is not the root node 105 (Node 0→N0) of the example synchronization hierarchy 400, then at block 705 the example synchronized data receive interface 630 may receive the information to be synchronized via propagation from the parent node associated with the instant node.

After the information to be synchronized is received at block 705, control proceeds to block 710 at which the example information synchronizer 600 determines whether the instant node is associated with any descendent nodes. For example, at block 710 the example synchronization sequencer 635 included in the example information synchronizer 600 may access a descendent node list stored in the example node list storage unit 625 to determine whether the instant node has any descendent nodes. If the instant node is not associated with any descendent nodes, then the instant node is a leaf node of the example synchronization hierarchy 400 and, thus, does not need to send the received information to any child nodes. In that case, the example process 700 then ends. However, if the instant node is associated with one or more descendent nodes, then the instant node will need to further send the received information to its direct child nodes and, accordingly, control proceeds to block 715.

Figure 8:
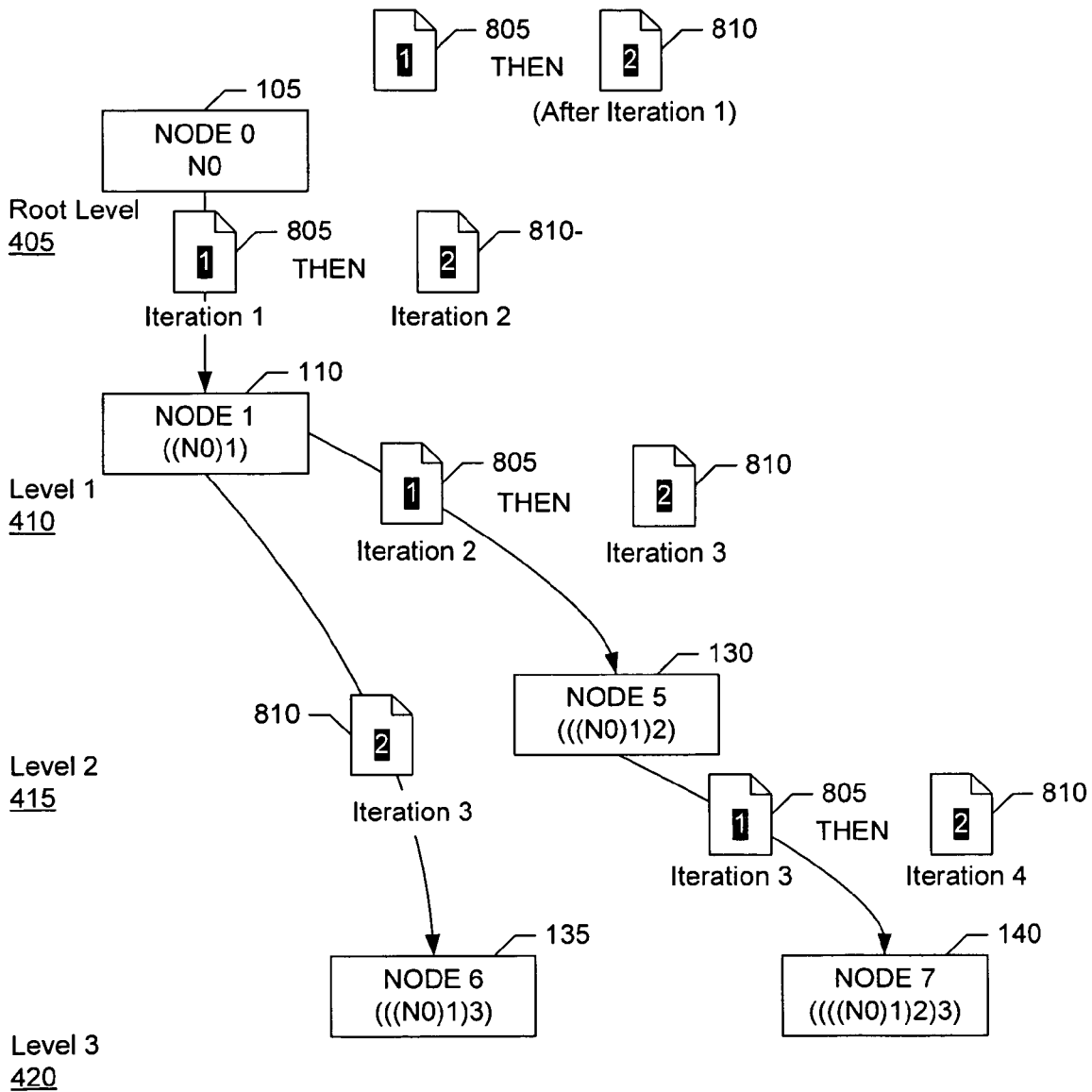
FIG. 8 illustrates an example operation of the example information synchronization process of FIG. 7 in which an information file is updated while a previous version of the information file is already being propagated among the nodes in the example sequential synchronization hierarchy of FIG. 4.

At block 715, the example information synchronizer 600 prepares the received information undergoing synchronization for propagating (e.g., sending) to the direct child nodes of the instant node. For example, at block 715 the synchronization sequencer 635 may buffer the received information in preparation for propagation to the next appropriate direct child node. Additionally, in some example implementations, at block 715 the example synchronization sequencer 635 may overwrite the information currently buffered for propagation to one or direct child nodes if a new version of that information is received while the previous version is still undergoing synchronization. By overwriting the previous version with the new version, the latest version of the information may be synchronized with the direct child nodes of the instant node more quickly than if the new version had to wait for synchronization of the previous version to be completed. An example operation of the information overwriting processing performed at block 715 is illustrated in FIG. 8 and discussed in greater detail below.

Figure 9:
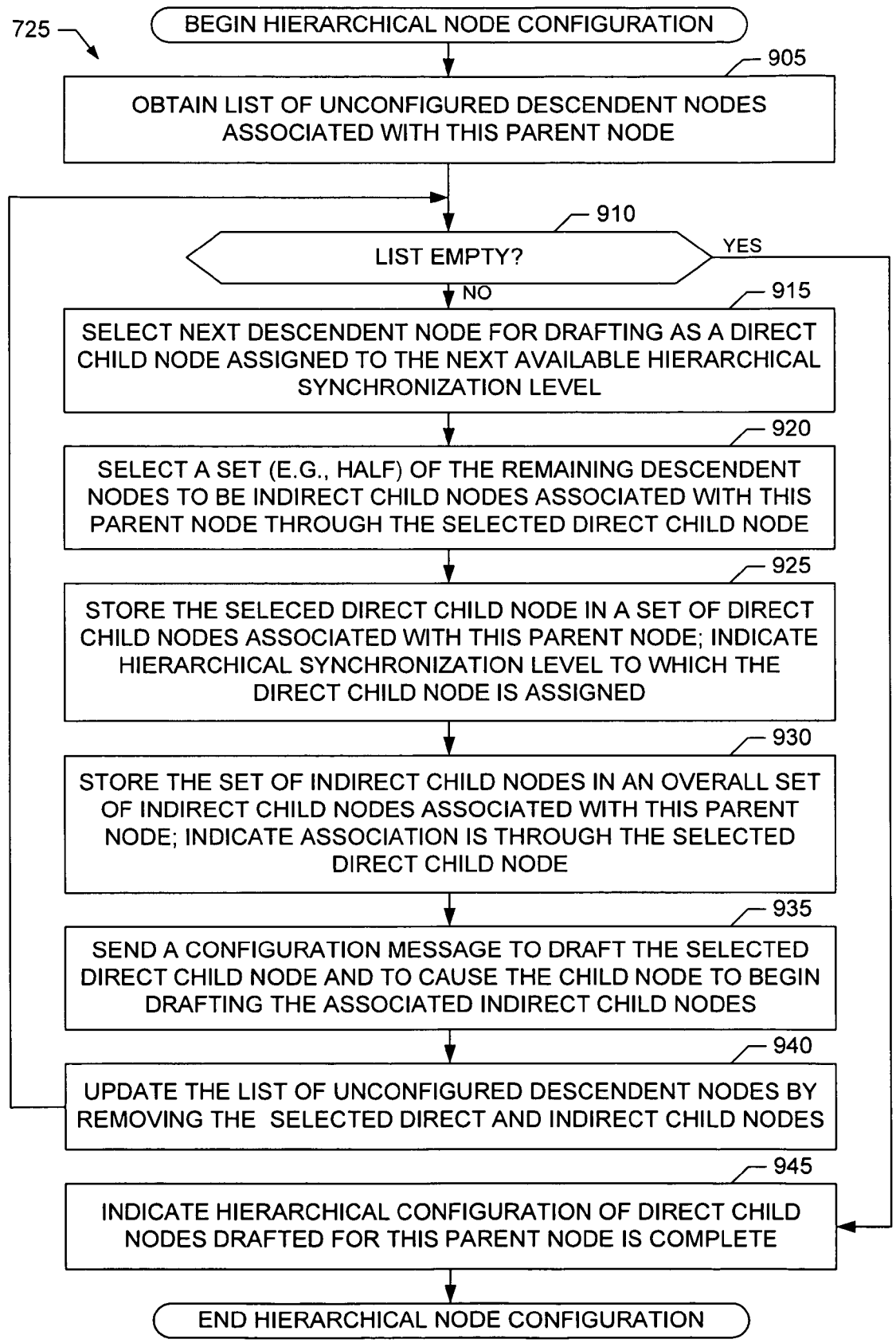
FIG. 9 is a flowchart representative of an example process to configure a sequential synchronization hierarchy that may be used to implement at least portions of the example process of FIG. 7, the example information synchronizer of FIG. 6 and/or the example sequential synchronization hierarchy of FIG. 4.

Next, control proceeds to block 720 at which the example information synchronizer 600 determines whether any of the descendent nodes associated with the instant node has not yet been configured for inclusion in the example synchronization hierarchy 400. For example, at block 720 the example synchronization sequencer 635 included in the example information synchronizer 600 may access a descendent node list stored in the example node list storage unit 625 to determine whether there are any remaining descendent node(s) that still need to be configured (e.g., drafted) for inclusion in the synchronization hierarchy 400. If any descendent nodes still require configuration (block 720), control proceeds to block 725 at which the example information synchronizer 600 performs a configuration procedure to configure (e.g., draft) one or more of the remaining unconfigured descendent nodes to be direct child node(s) at respective, unique hierarchical synchronization levels. Additionally, one or more remaining unconfigured descendent nodes may be selected for inclusion in one or more sets of indirect child nodes to be associated with one or more of the newly configured direct child nodes, as discussed above. An example process for performing the processing at block 725 is illustrated in FIG. 9 and discussed in greater detail below.

Next, control proceeds to block 730 at which the example information synchronizer 600 determines whether the one or more unconfigured descendent node(s) selected to be direct child node(s) of the instant node were successfully configured (e.g., drafted). In the illustrated example, at block 730 the example information synchronizer 600 does not consider whether any indirect child nodes selected for association with the direct child node(s) of the instant node have been successfully configured because, as discussed above, synchronization can proceed so long as one or more direct child nodes have been configured. If the direct child node(s) have not yet been successfully configured (block 730), control proceeds to block 735 at which the example information synchronizer 600 waits until the direct child node(s) have been configured successfully. After the direct child node(s) have been configured successfully, control proceeds to block 740.

Beginning with block 740, the example information synchronizer 600 sends the information undergoing synchronization sequentially to each of the instant node's direct child nodes in priority order according to the set of hierarchical synchronization levels to which the direct child nodes are associated. As discussed above, each direct child node is associated with a unique hierarchical synchronization level having a different synchronization priority. Thus, the set of hierarchical synchronization levels corresponding to the set of direct child nodes of the instant node can be used to define a priority ordering for sequentially propagating the information undergoing synchronization to each of the direct child nodes of the instant node.

With this in mind, at block 740 the example information synchronizer 600 selects the direct child node associated with the highest priority hierarchical synchronization level among the remaining direct child nodes to which the information undergoing synchronization is to be sequentially propagated. For example, at block 740 the example synchronization sequencer 635 included in the example information synchronizer 600 may access the example node list storage unit 625 to process a list of direct child nodes and associated hierarchical synchronization levels to select the next direct child node for synchronization scheduling. After the next direct child node is selected at block 740, control proceeds to block 745 at which the example information synchronizer 600 sends the information undergoing synchronization to the selected direct child node. For example, at block 745, the example synchronized data transmit interface 640 included in the example information synchronizer 600 may transmit the information undergoing synchronization to the selected direct child node in the form of one or more data (e.g., configuration) files, one or more data packets, etc.

Next, control proceeds to block 750 at which the example information synchronizer 600 determines whether the information undergoing synchronization has been sent sequentially to all direct child nodes of the instant node. If the information has not been sent to all direct child nodes (block 750), control returns to block 740 and blocks subsequent thereto at which the example information synchronizer 600 selects the next direct child node is order of hierarchical priority to which the information undergoing synchronization is to be propagated sequentially. However, if the information has been propagated to all direct child nodes (block 750), execution of the example process 700 then ends.

An example operation of the information overwriting processing performed at block 715 of the example information synchronization process 700 of FIG. 7 is illustrated in FIG. 8. FIG. 8 depicts a portion of the example sequential synchronization hierarchy 400 to illustrate the example synchronized information overwriting process. In the illustrated example, a first version 805 of an information file is undergoing synchronization and, thus, is being propagated among the nodes of the example synchronization hierarchy 400. In this particular example, the first version 805 of the information file has been received by the root node 105 (Node 0→N0) and propagated to its child node 110 (Node 1→((N0)1)) at the first hierarchical level 410 during a first synchronization iteration.

Next, after the first synchronization iteration but before the second synchronization iteration, a second version 810 of the same information file is provided to the root node 105 (Node 0→N0) for synchronization in the illustrated example. Thus, before the second iteration, the root node 105 (Node 0→N0) updates its local copy of the information file with the second version 810, but its child node 110 (Node 1→((N0)1)) still has only the first version 805. Then, during the second synchronization iteration, the root node 105 (Node 0→N0) sends the second version 810 of the information file to its child node 110 (Node 1→((N0)1)) at the first hierarchical level 410, while the node 110 sends the first version 805 of the information file to its child node 130 (Node 5→(((N0)1)2)) at the second hierarchical level 415. The node 110 still propagates the first version 805 of the information file because it does not have access to the second version 810 until receiving it during the second synchronization iteration.

Next, instead of continuing to propagate the first version 805 of the information file sequentially to its remaining child node, the node 110 (Node 1→((N0)1)) uses the information overwriting processing of, for example, block 715 discussed above to overwrite the first version 805 of the information file with the new second version 810. In this way, the node 110 (Node 1→((N0)1)) can immediately begin propagating the second version 810 of the information file to its remaining direct child nodes without waiting for synchronization of the first version 805 to be completed. Thus, during the third synchronization iteration, the node 110 (Node 1→((N0)1)) sends the second version 810 of the information file to its child node 135 (Node 6→(((N0)1)3)) at the third hierarchical level 415, even though the first version 805 is still being propagated through the example synchronization hierarchy 400 as shown.

An example hierarchical node configuration process 725 that may be executed to implement the processing at block 725 of FIG. 7 and/or at least a portion of the example information synchronizer 600 of FIG. 6 to configure, for example, one or more of the networked nodes 105-140 of the example process control system 100 for inclusion in the example sequential synchronization hierarchy 400 is illustrated in FIG. 9. In an example implementation, an instance of the example hierarchical node configuration process 725 is executed by each of the example networked nodes 105-140 to, for example, configure at least a portion of the example sequential synchronization hierarchy 400 associated with the respective node. As such, the example hierarchical node configuration process 725 may be used to implement distributed configuration in which each networked node can operate as a parent node responsible for configuring the portion of the sequential synchronization hierarchy including its directly associated child nodes. Without loss of generality, operation of the example hierarchical node configuration process 725 is described in the context of execution by a representative networked node, referred to hereinbelow as the "instant node," which could be, for example, any one of the example networked nodes 105-140. The example hierarchical node configuration process 725 may be executed at predetermined intervals at which configuration of nodes for inclusion in the example synchronization hierarchy 400 is expected, based on an occurrence of a predetermined event (e.g., such as an interrupt scheduling execution of the example process 725), continuously as a background process, etc., or any combination thereof.

Turning to FIG. 9, the example hierarchical node configuration process 725 begins at block 905 at which the example information synchronizer 600 obtains a list of the set of descendent networked nodes (i.e., a descendent node list) to be associated with instant node. For example, at block 905 the example node configuration interface 605 included in the example information synchronizer 600 may obtain the descendent node list and store the list in the example node list storage unit 625. Furthermore, and as discussed above, if the instant node is the root node 105 (Node 0→N0) of the example synchronization hierarchy 400, then at block 905 the example node configuration interface 605 may obtain the descendent node list based on available network configuration information, user input, etc. Alternatively, if the instant node is not the root node 105 (Node 0→N0) of the example synchronization hierarchy 400, then at block 905 the example node configuration interface 605 may obtain the descendent node list from a configuration message sent by the instant node's associated parent node.

After obtaining the descendent node list for the instant node, control proceeds to block 910 at which the example information synchronizer 600 determines whether the descendent node list is empty. For example, at block 910 the example node selector 610 included in the example information synchronizer 600 may retrieve the descendent node list from the example node list storage unit 625 and determine whether the list is empty. If the descendent node list is not empty (block 910), there are remaining descendent nodes to be configured and, therefore, control proceeds to block 915.

At block 915, the example information synchronizer 600 selects a next available descendent node in the descendent node list to be a direct child of the instant node assigned to a next available hierarchical synchronization level. For example, at block 915 the example node selector 610 included in the example information synchronizer 600 may retrieve the descendent node list from the example node list storage unit 625 and select the next remaining descendent node to be a direct child of the instant node. The example node selector 610 updates the descendent node list stored in the example node list storage unit 625 by removing the selected direct child node. As discussed in greater detail below, the selected direct child node will be assigned to the next available hierarchical synchronization level and configured to receive information undergoing synchronization directly from the instant node.

After the next direct child node is selected, control proceeds to block 920 at which the example information synchronizer 600 selects a set of the remaining descendent nodes from the descendent node list to be a set of indirect child nodes associated with the instant node through the direct child node selected at block 915. For example, at block 920 the example node list segmenter 615 included in the example information synchronizer 600 may retrieve the descendent node list from the example node list storage unit 625 and select half (e.g., rounded up or down, if necessary, when there are an odd number of remaining nodes) of the remaining nodes to be indirect child nodes to be configured to receive information undergoing synchronization through the direct child node selected at block 915.

Next, control proceeds to block 925 at which the example information synchronizer 600 includes the descendent node selected at block 915 to be a direct child node in a set of direct child nodes associated with the instant node. Additionally, at block 925 the example information synchronizer 600 assigns the selected direct child node to a next available (e.g., lowest priority) hierarchical synchronization level in a set of hierarchical synchronization levels to which the set of direct child nodes associated with the instant node are assigned. Relative to the instant node, this assignment allows the selected direct child node to be associated with a unique hierarchical synchronization level in the example synchronization hierarchy 400. In an example implementation, at block 925 the example node selector 610 may include the selected direct child node and its associated hierarchical synchronization level in a direct child node list maintained in the example node list storage unit 625.

Next, control proceeds to block 930 at which the example information synchronizer 600 includes the set of indirect nodes selected at block 915 in an overall set of indirect child nodes associated with the instant node. Additionally, at block 930 the example information synchronizer 600 indicates that the newly selected set of indirect child nodes are to be associated with instant node through the direct child node selected at block 915. For example, at block 930 the example node segmenter 615 may include the newly selected set of indirect child nodes and their association with the newly selected direct child node in an indirect child node list maintained in the example node list storage unit 625.

Control next proceeds to block 935 at which the example information synchronizer 600 configures the networked node selected at block 915 to be a direct child node of the instant node in the example synchronization hierarchy 400. Additionally, at block 935 the example information synchronizer 600 provides the set of indirect child nodes selected at block 920 to the direct child node to allow the direct child node to begin configuring the set of indirect child nodes for inclusion in the example synchronization hierarchy 400. For example, at block 935 the example child drafting interface 620 included in the example information synchronizer 600 may send a configuration (e.g., drafting) message to the selected direct child node that also describes the set of the indirect child nodes to be associated with the direct child node. The received configuration message in such an example causes the direct child to treat the instant node as its associated parent node and begin hierarchical configuration of the set of indirect child nodes.

After processing at block 935 completes, control proceeds to block 940 at which the example information synchronizer 600 updates the descendent node list for the instant node by removing the direct child node selected at block 915 and the corresponding set of indirect child nodes selected at block 920. In this way, the descendent node list represents the unconfigured descendent nodes of the instant node. For example, at block 940 the example information synchronizer 600 may update the descendent node list stored in the example node list storage unit 625. Of course, if the descendent node list has already been updated during, for example, the selection processing at blocks 915 and 920, the processing performed at block 940 is unnecessary and block 940 can, therefore, be removed from the example process 725. Control then returns to block 910 and blocks subsequent thereto at which the example information synchronizer 600 continues to configure the networked nodes remaining in the instant node's list of descendent nodes.

Returning to block 910, if the descendent node list is empty (block 910), there are no descendent nodes remaining to be configured and, therefore, control proceeds to block 945. At block 945, the example information synchronizer 600 indicates that configuration of the direct child nodes associated with the instant node is complete. For example, at block 945 the example information synchronizer 600 may assert a status signal, issue a status message, etc., to indicate that configuration of the direct child nodes is complete. Execution of the example hierarchical node configuration process 725 then ends.

Figure 10:
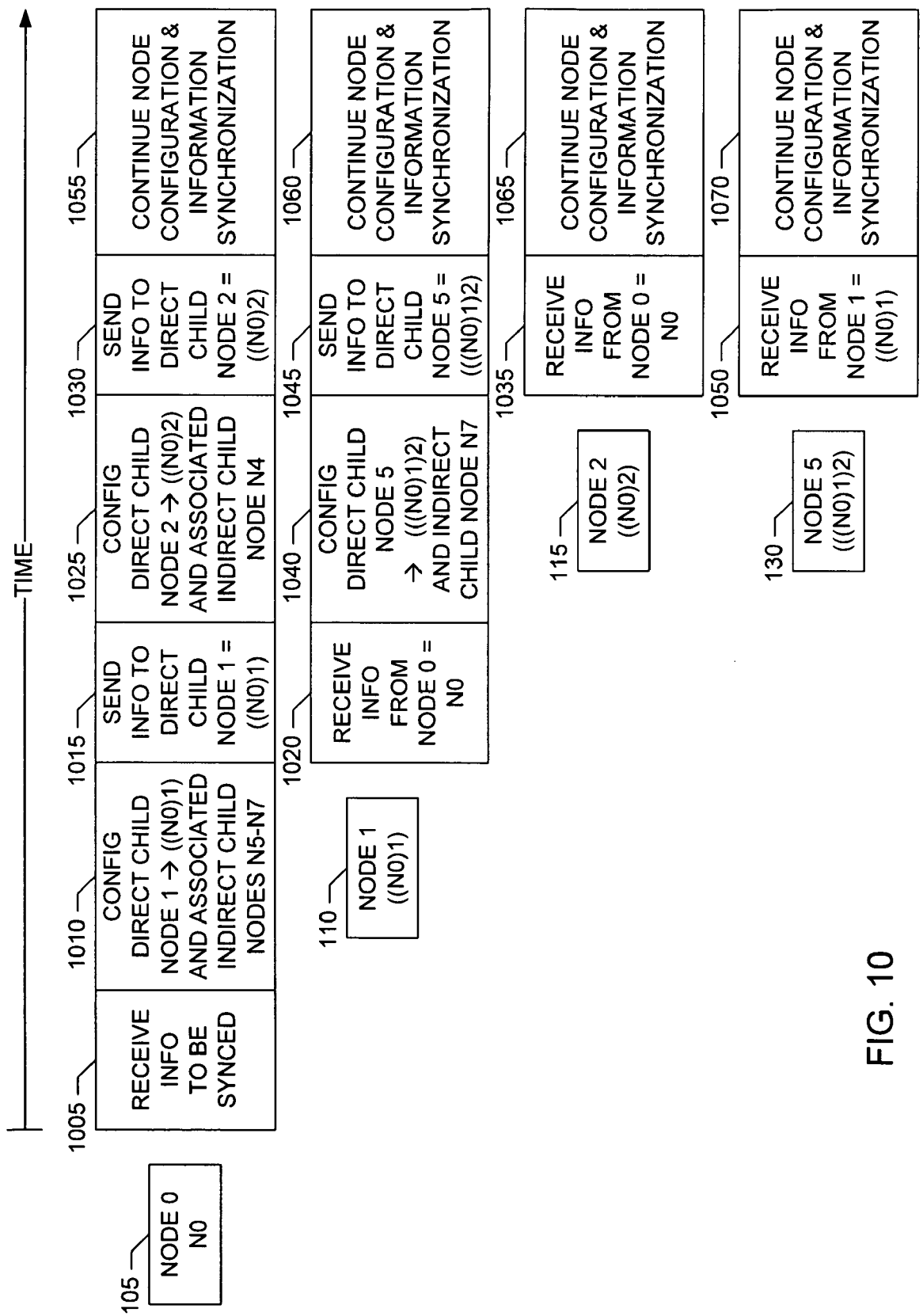
FIG. 10 illustrates an example operation of the example processes of FIGS. 7 and 9 to perform distributed information synchronization and hierarchical node configuration in the example sequential synchronization hierarchy of FIG. 4.

An example operation of multiple instances of the example information synchronization process 700 of FIG. 7 and the example hierarchical node configuration process 725 of FIG. 9 to perform distributed information synchronization in a portion of the example sequential synchronization hierarchy 400 of FIG. 4 is illustrated in FIG. 10. In particular, FIG. 10 illustrates distributed information synchronization and node configuration performed by four of the nodes included in the example sequential synchronization hierarchy 400. In the illustrated example, each of these four nodes is configured to execute an instance of the example information synchronization process 700 and the example hierarchical node configuration process 725.

Turning to FIG. 10, and with reference to the example sequential synchronization hierarchy 400 of FIG. 4, the illustrated example operation begins at block 1005 with the root node 105 (Node 0→N0) receiving information to be synchronized in the example sequential synchronization hierarchy 400. In response, at block 1010 the root node 105 (Node 0→N0) invokes at least a portion of its instance of the example hierarchical node configuration process 725 to configure the node 110 (Node 1→((N0)1)) to be its first direct child node. Additionally, at block 1010 the process 725 sends node 110 a list of indirect child nodes to be configured by node 110 for inclusion in the synchronization hierarchy 400. After node 110 (Node 1→((N0)1)) is configured, and regardless of whether configuration of any associated indirect child nodes has been completed, at block 1015 the root node 105 (Node 0→N0) invokes at least a portion of its instance of the example information synchronization process 700 to send the information undergoing synchronization to its first direct child node 110 (Node 1→((N0)1)). Accordingly, the direct child node 110 (Node 1→((N0)1)) receives the information from its corresponding parent node 105 (Node 0→N0) at block 1020.

Next, because each node can perform synchronization processing autonomously, the root node 105 (Node 0→N0) continues performing information synchronization and node configuration at substantially the same time (e.g., simultaneously) the node 110 (Node 1→((N0)1)) performs its own information synchronization and node configuration. More specifically, at block 1025 the root node 105 (Node 0→N0) invokes at least a portion of its instance of the example hierarchical node configuration process 725 to configure the node 115 (Node 2→((N0)2)) to be its second direct child node. Additionally, at block 1025 the process 725 sends node 115 a list of indirect child nodes to be configured by node 115 for inclusion in the synchronization hierarchy 400. After node 115 (Node 2→((N0)2)) is configured, and regardless of whether configuration of any associated indirect child nodes has been completed, at block 1030 the root node 105 (Node 0→N0) invokes at least a portion of its instance of the example information synchronization process 700 to send the information undergoing synchronization to its second direct child node 115 (Node 2→((N0)2)). Accordingly, the direct child node 115 (Node 2→((N0)2)) receives the information from its corresponding parent node 105 (Node 0→N0) at block 1035.

At substantially the same time, at block 1040 the node 110 (Node 1→((N0)1)) invokes at least a portion of its instance of the example hierarchical node configuration process 725 to process the set of indirect nodes received previously from its parent node 105 (Node 0→N0). In the illustrated example, at block 1040 the process 725 configures the node 130 (Node 5→(((N0)1)2)) to be node 110's first direct child node. Additionally, at block 1040 the process 725 sends node 130 a list of indirect child nodes to be configured by node 130 for inclusion in the synchronization hierarchy 400. After node 130 (Node 1→(((N0)1)2)) is configured, and regardless of whether configuration of any associated indirect child nodes has been completed, at block 1045 the node 110 (Node 1→((N0)1)) invokes at least a portion of its instance of the example information synchronization process 700 to send the information received at block 1020 to its first direct child node 130 (Node 5→(((N0)1)2)). Accordingly, the direct child node 130 (Node 5→(((N0)1)2)) receives the information from its corresponding parent node 110 (Node 1→((N0)1)) at block 1050.

At this stage in the illustrated example operation of FIG. 10, the example nodes 105 (Node 0→N0), 110 (Node 1→((N0)1)), 115 (Node 2→((N0)2)), and 130 (Node 5→(((N0)1)2)) each possess the information undergoing synchronization. Accordingly, because each node can perform synchronization processing autonomously, the nodes 105, 110, 115 and 120 continue performing information synchronization and node configuration for their respective portions of the example synchronization hierarchy 400 at blocks 1055, 1060, 1065 and 1070, respectively, at substantially the same time.

Figure 11A:
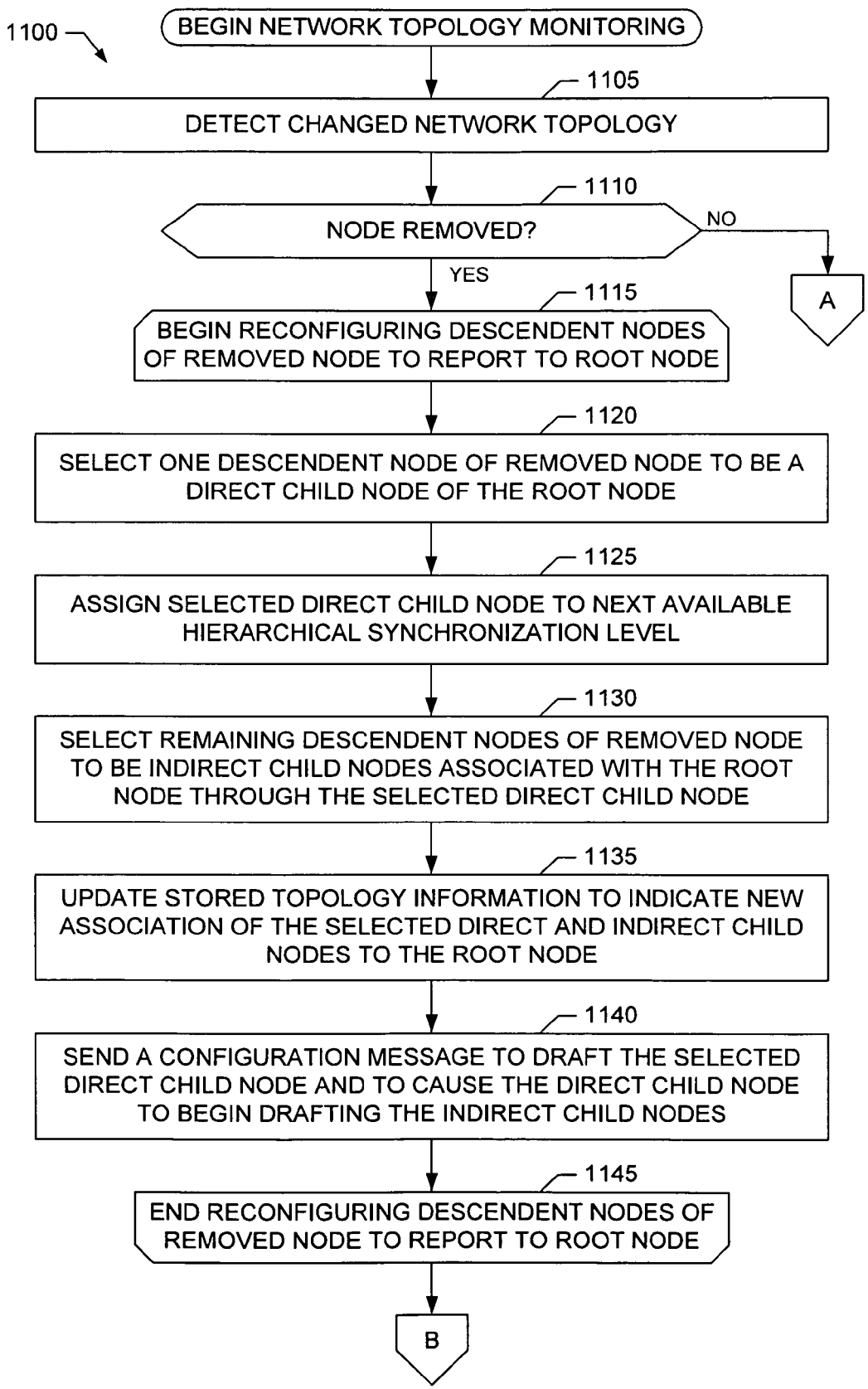
FIGS. 11A-11B collectively are a flowchart representative of an example process to perform network topology monitoring that may be used to implement at least portions of the example information synchronizer of FIG. 6 and/or the example sequential synchronization hierarchy of FIG. 4.
Figure 11B:
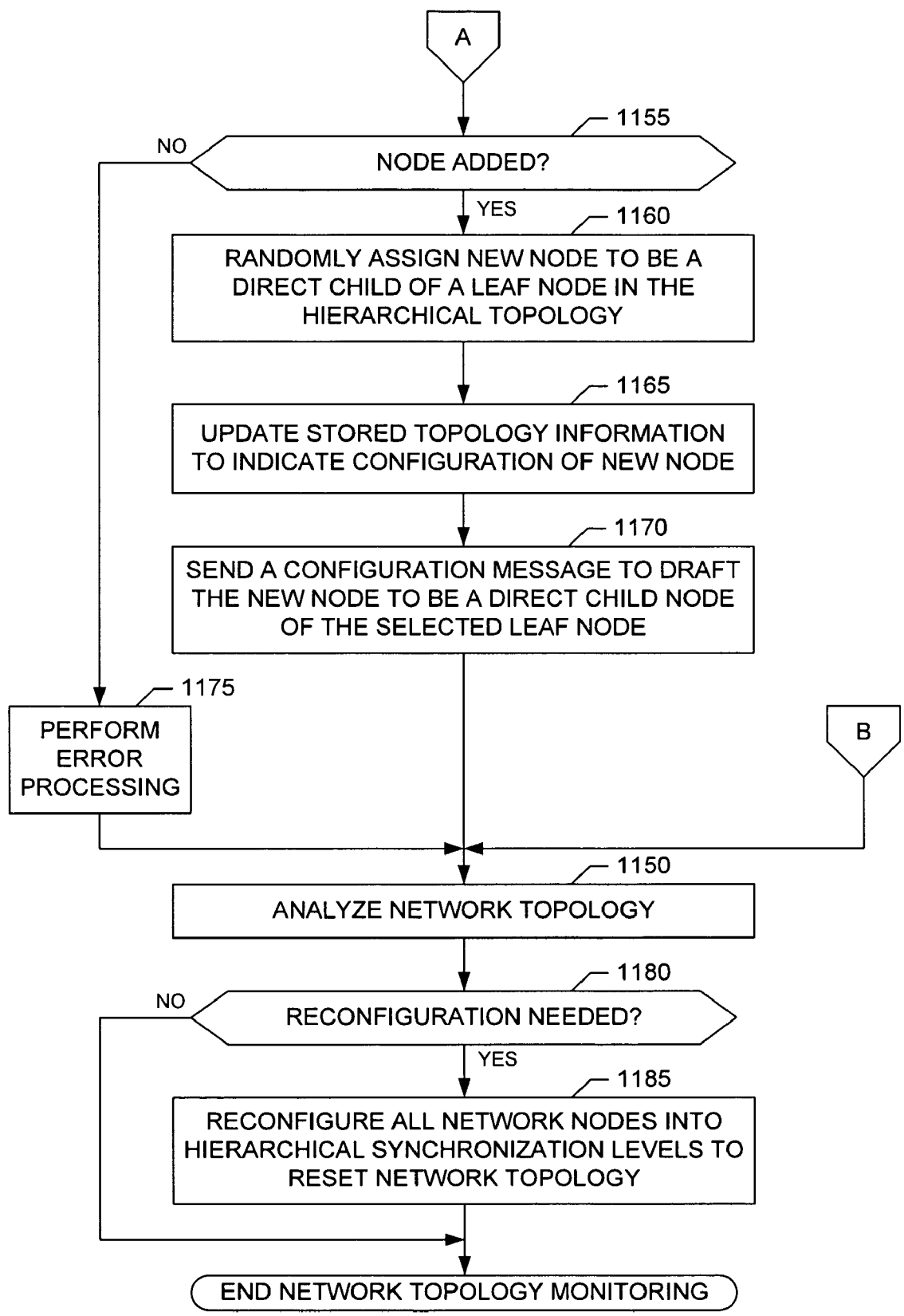

An example network topology monitoring process 1100 for monitoring a synchronization hierarchy, such as the example synchronization hierarchy 400 of FIG. 4, is illustrated in FIGS. 11A-11B. In an example implementation, the network topology monitoring process 1100 is executed by the root node 105 (Node 0→N0) of the example sequential synchronization hierarchy 400. The example network topology monitoring process 1100 may be executed at predetermined intervals at which network topology monitoring is to be performed, based on an occurrence of a predetermined event (e.g., such as an interrupt scheduling execution of the example process 1100), continuously as a background process, etc., or any combination thereof.

Turning to FIG. 11A, the example network topology monitoring process 1100 begins at block 1105 at which the example information synchronizer 600 supporting the root node 105 (Node 0→N0) detects a change in the network topology implementing the example synchronization hierarchy 400. For example, at block 1105 the example error processor 645 included in the example information synchronizer 600 may receive and/or otherwise determine an indication that an existing networked node has been removed from the example synchronization hierarchy 400 or that a new networked node has been added to the example process control system 100 and is to be included in the example synchronization hierarchy 400. In an example implementation, the example error processor 645 may determine that a node has been removed from the example synchronization hierarchy 400 when no acknowledgment is received from a direct child node in response to, for example, a sent configuration message or sent information to be synchronized. The example error processor 645 may determine that a node is to be added to the example synchronization hierarchy 400 from network configuration information provided by a user and/or otherwise made available and/or queried (e.g., from another networked device such as a name server, router, etc.).

After detecting a changed network topology, control proceeds to block 1110 at which the example information synchronizer 600 determines whether the detected change corresponds to a removed networked node. If the change corresponds to removal of a networked node (block 1110), control proceeds to block 1115 at which the example information synchronizer 600 begins reconfiguring any descendent nodes of the removed node to be descendents of the root node 105 (Node 0→N0) reporting to the root node 105 through a new direct child selected from the descendent node(s) of the removed node. For example, at block 1115 the example information synchronizer 600 may retrieve topology configuration information describing the overall example synchronization hierarchy 400 from the example node list storage unit 625 supporting the root node 105 (Node 0→N0) to determine which networked node(s), if any, were descendents of the removed node.

Assuming that the removed node had at least one descendent node, to reconfigure the descendent(s) of the removed node, control proceeds to block 1120 at which the example information synchronizer 600 selects one of the descendent node(s) to be a new direct child node of the root node 105 (Node 0→N0). For example, at block 1120 the example node selector 610 included in the example information synchronizer 600 may select the descendent node which was assigned to the highest priority hierarchical synchronization level among the group of descendent node(s) of the removed node. Alternatively, the selection may be random or based on any other selection criteria.

After a new direct child node is selected at block 1120, control proceeds to block 1125 at which the example information synchronizer 600 assigns the newly selected direct child node to the next available hierarchical synchronization level relative to the root node 105 (Node 0→N0). For example, at block 1125 the example information synchronizer 600 assigns the selected direct child node to a next available (e.g., lowest priority) hierarchical synchronization level in a set of hierarchical synchronization levels to which the set of direct child nodes associated with the root node 105 (Node 0→N0) are assigned. Control then proceeds to block 1130 at which the example information synchronizer 600 selects the remaining descendent node(s) of the removed node to be indirect child nodes associated with the root node 105 (Node 0→N0) through the direct child node selected at block 1125.

Next, control proceeds to block 1135 at which the example information synchronizer 600 updates the topology information describing the set of direct child nodes and overall set of indirect child nodes reporting to the root node 105 (Node 0→N0). For example, at block 1135 the example information synchronizer 600 may include the selected direct child node and its associated hierarchical synchronization level in a direct child node list maintained for the root node 105 (Node 0→N0) in the example node list storage unit 625. Additionally, the example information synchronizer 600 may include the newly selected set of indirect child nodes and their association with the newly selected direct child node in an indirect child node list maintained for the root node 105 (Node 0→N0) in the example node list storage unit 625.

Next, control proceeds to block 1140 at which the example information synchronizer 600 configures the networked node selected at block 1120 to be a direct child node of the root node 105 (Node 0→N0) in the example synchronization hierarchy 400. Additionally, at block 1140 the example information synchronizer 600 provides the set of indirect child nodes selected at block 1130 to the direct child node to allow the direct child node to begin configuring the set of indirect child nodes for inclusion in the example synchronization hierarchy 400. For example, at block 1140 the example child drafting interface 620 included in the example information synchronizer 600 may send a configuration (e.g., drafting) message to the selected direct child node that also describes the set of the indirect child nodes to be associated with the direct child node. The received configuration message causes the direct child to treat the root node 105 (Node 0→N0) as its associated parent node and begin hierarchical configuration of the set of indirect child nodes. Reconfiguration of any descendent node(s) of the removed networked nodes is then complete (block 1145) and control proceeds to block 1150 of FIG. 11B.

Returning to block 1110 of FIG. 11A, if the detected network topology change does not correspond to removal of a networked node, control proceeds to block 1155 of FIG. 11B at which the example information synchronizer 600 determines whether the detected change corresponds to a networked node to be added to the synchronization hierarchy 400. If the change corresponds to an added networked node (block 1155), control proceeds to block 1160 at which the example information synchronizer 600 randomly assigns the new networked node to be a direct child node of a leaf node in the example synchronization hierarchy 400. As discussed above, a leaf node in the example synchronization hierarchy 400 is a node having no direct child nodes. In an example implementation, at block 1160 the example information synchronizer 600 may retrieve topology configuration information describing the overall example synchronization hierarchy 400 from the example node list storage unit 625 supporting the root node 105 (Node 0→N0) to determine which networked nodes are leaf nodes in the example synchronization hierarchy 400. The example information synchronizer 600 may then select one of the leaf nodes from the retrieved topology configuration information to be the parent node of the new networked node to be added to the synchronization hierarchy 400.

Next, control proceeds to block 1165 at which the example information synchronizer 600 updates the topology configuration information describing the overall example synchronization hierarchy 400. For example, at block 1165 the example information synchronizer 600 may update topology configuration information describing the overall example synchronization hierarchy 400 that is stored in the example node list storage unit 625 supporting the root node 105 (Node 0→N0). Control then proceeds to block 1170 at which the example information synchronizer 600 configures the newly added networked node to be a direct child node of the leaf node selected at block 1160. For example, at block 1170 the example child drafting interface 620 included in the example information synchronizer 600 may send a configuration (e.g., drafting) message to the selected leaf node that causes the leaf node to treat the added node as a direct child node. Additionally, the example child drafting interface 620 may send another configuration message to the newly added network node to cause it to treat the selected leaf node as its associated parent node. Control then proceeds to block 1150.

Returning to block 1155, if the detected network topology change does not correspond to addition of a networked node, control proceeds to block 1175 at which the example information synchronizer 600 performs any appropriate error processing to handle the case in which the type of detected topology change cannot be determined. Control then proceeds to block 1150.

At block 1150, the example information synchronizer 600 analyzes the overall configuration of the example sequential synchronization hierarchy 400. For example, at block 1150 the example error processor 645 (and/or a separate network monitor) may monitor the topology of the example sequential synchronization hierarchy 400 to determine whether one or more parent-child (or, more specifically, parent-child-descendent) propagation paths through the example synchronization hierarchy 400 have become significantly longer than the others due to, for example, node addition and/or removal, thus requiring reconfiguration of the entire synchronization hierarchy 400. Control then proceeds to block 1180 at which the example information synchronizer 600 determines whether reconfiguration of the entire synchronization hierarchy 400 is needed. If reconfiguration is not needed (block 1180), execution of the example network topology monitoring process 1100 then ends. However, if reconfiguration is needed (block 1180), control proceeds to block 1185.

At block 1185, the example information synchronizer 600 destroys the existing synchronization hierarchy 400 and initiates reconfiguration of a sequential synchronization hierarchy 400. For example, at block 1185 the example information synchronizer 600 may invoke some or all of the hierarchical node configuration process 725 of FIG. 9 to initiate reconfiguration of the current nodes included the example process control system 100 to form a new example sequential synchronization hierarchy 400. After reconfiguration process at block 1185 completes, execution of the example network topology monitoring process 1100 then ends.

Figure 12:
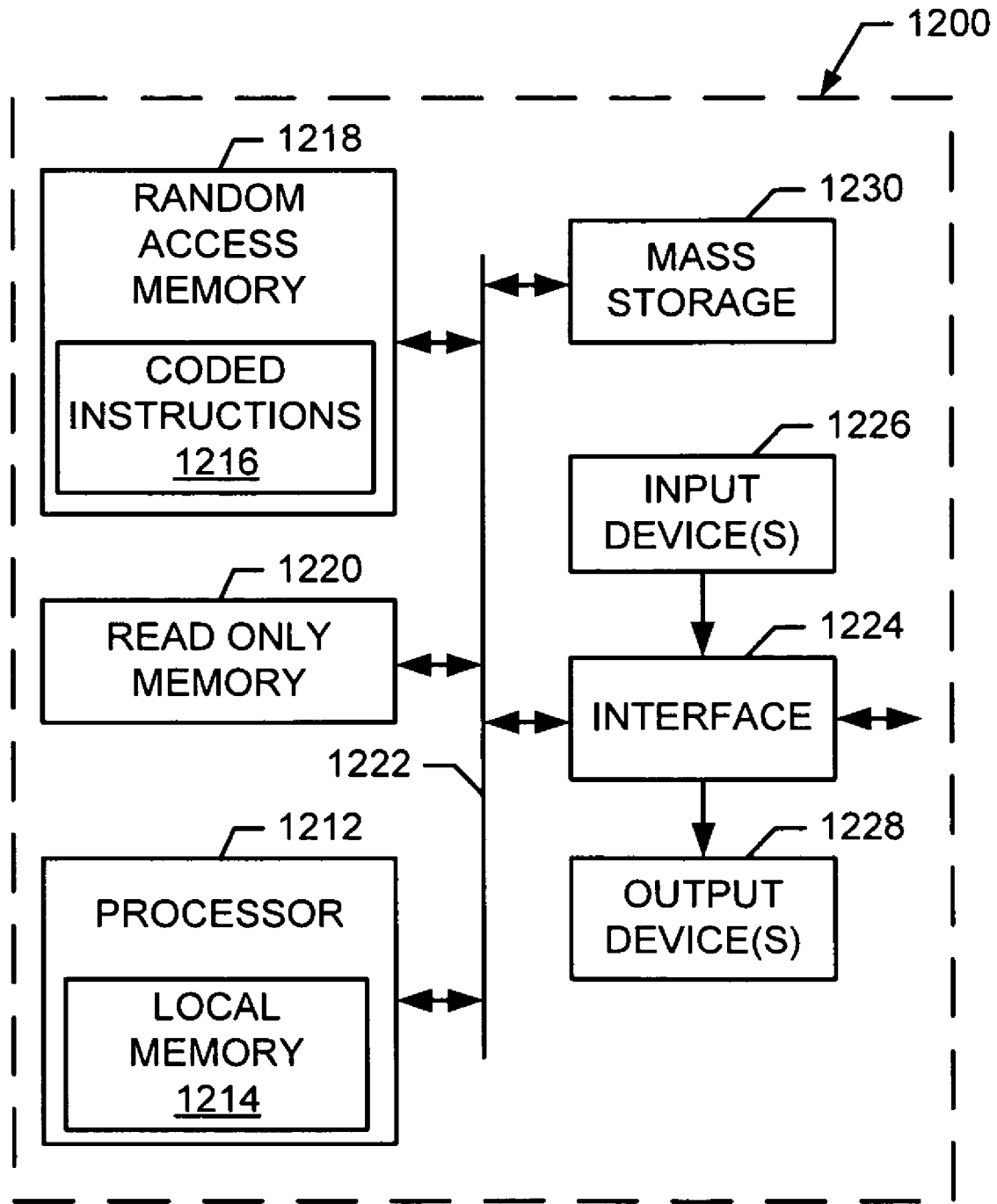
FIG. 12 is a block diagram of an example computer that may execute example machine readable instructions used to implement some or all of the processes of FIGS. 7, 9 and/or 11A-11B to implement at least portions of the example information synchronizer of FIG. 6 and/or the example sequential synchronization hierarchy of FIG. 4.

FIG. 12 is a block diagram of an example computer 1200 capable of implementing the apparatus and methods disclosed herein. The computer 1200 can be, for example, a server, a personal computer, a personal digital assistant (PDA), an Internet appliance, a DVD player, a CD player, a digital video recorder, a personal video recorder, a set top box, or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, machine readable instructions to implement the processes represented in FIGS. 7, 9 and 11A-11B. The processor 1212 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown).

The computer 1200 also includes an interface circuit 1224. The interface circuit 1224 may be implemented by any type of interface standard, such as an Ethernet interface, a universal serial bus (USB), and/or a third generation input/output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a cathode ray tube display (CRT)), by a printer and/or by speakers. The interface circuit 1224, thus, typically includes a graphics driver card.

The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1200 also includes one or more mass storage devices 1230 for storing software and data. Examples of such mass storage devices 1230 include floppy disk drives, hard drive disks, compact disk drives and digital versatile disk (DVD) drives. The mass storage device 1230 may implement the example node list storage unit 625. Alternatively, the volatile memory 1218 may implement the example node list storage unit 625.

As an alternative to implementing the methods and/or apparatus described herein in a system such as the device of FIG. 12, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to synchronize information within a hierarchical synchronization topology comprising a plurality of networked nodes, the method comprising:
    configuring a first networked node to be a parent node associated directly with second and third networked nodes configured to be respective first and second direct child nodes of the parent node;
    selecting one or more other networked nodes to be a first set of indirect child nodes associated indirectly with the parent node through the first direct child node; and
    configuring the parent node to send information undergoing synchronization to the first and second direct child nodes sequentially based on a plurality of hierarchical synchronization levels to which the first and second direct child nodes are associated, but to not send the information to the first set of indirect child nodes, wherein the first direct child node is to propagate the information to the first set of indirect child nodes while the parent node is to send the information to the second direct child node.

2. A method as defined in claim 1 wherein the first and second direct child nodes are each associated with a unique hierarchical synchronization level from the plurality of hierarchical synchronization levels.

3. A method as defined in claim 1 wherein the first direct child node is to send the information sequentially to at least some of the indirect child nodes in the first set of indirect child nodes.

4. A method as defined in claim 3 wherein the first set of indirect child nodes comprises a first subset and a second subset, wherein the first direct child node is associated directly with the first subset of indirect child nodes according to a first set of hierarchical synchronization levels, and wherein after receipt of the information from the parent node, the first direct child is to send the information sequentially to the first subset of indirect child nodes based on the associated first set of hierarchical synchronization levels, but to not send the information to the second subset of indirect child nodes.

5. A method as defined in claim 4 wherein each indirect child node in the first subset of indirect child nodes is associated with a unique hierarchical synchronization level from the first set of hierarchical synchronization levels.

6. A method as defined in claim 4 further comprising selecting one or more other networked nodes to be a second set of indirect nodes associated indirectly with the parent node through the second direct child node, wherein after receipt of the information from the parent node, the second direct child node is to send the information sequentially to at least some of the indirect child nodes in the second set of indirect child nodes based on a second set of hierarchical synchronization levels to which the second set of indirect child nodes are associated.

7. A method as defined in claim 6 wherein the second direct child node is to receives the information from the parent node after the first direct child node is to receive the information from the parent node, and wherein the second direct child node is to send the information sequentially to an indirect child node in the second set of indirect child nodes while the first direct child node is to send the information sequentially to an indirect child node in the first subset of indirect child nodes.

8. A method as defined in claim 1 further comprising configuring the plurality of networked nodes according to the plurality of hierarchical synchronization levels by:
   associating the first networked node with a first hierarchical synchronization level;
   associating the second networked node with a second hierarchical synchronization level having lower priority than the first hierarchical synchronization level;
   associating the third networked node with a third hierarchical synchronization level having lower priority than the second hierarchical synchronization level; and
   associating a fourth networked node with a fourth hierarchical synchronization level having higher priority than the first hierarchical synchronization level, wherein the fourth networked node is configured to be a sole parent of the first networked node.

9. A method as defined in claim 8 wherein first networked node is configured to receive the information undergoing synchronization from the fourth networked node and to send the information sequentially to the second networked node and then the third networked node according to the second hierarchical synchronization level having higher priority than the third hierarchical synchronization level.

10. A method as defined in claim 9 further comprising associating the first networked node with a fifth networked node configured to be an indirect child node associated with the first networked node through the second networked node, wherein the fifth networked node is associated with the third hierarchical synchronization level, and wherein after receiving the information undergoing synchronization from the first networked node, the second networked node is to send the information to the fifth networked node while the first networked node is to send the information to the third networked node.

11. A method as defined in claim 1 further comprising configuring the plurality of networked nodes according to the plurality of hierarchical synchronization levels by:
   obtaining a set of descendent nodes selected from the plurality of networked nodes for associating with the first networked node;
   selecting a first descendent node in the set of descendent nodes to be the first direct child node and to be associated with the first networked node at a first hierarchical synchronization level;
   selecting a first subset of the set of descendent nodes, excluding the first descendent node, to be the first set of indirect child, nodes associated with the first networked node through the first direct child node according to a corresponding first set of hierarchical synchronization levels having lower priority than the first hierarchical synchronization level; and
   drafting the selected first descendent node to be the first direct child node of the first networked node by:
      configuring the first networked node to be a sole parent node associated with the first descendent node; and
      indicating the selected first set of indirect child nodes to the selected first descendent node to allow the first descendent node to continue configuring the first set of indirect child nodes according to the first set of hierarchical synchronization levels.

12. A method as defined in claim 11 further comprising configuring the plurality of networked nodes according to the plurality of hierarchical synchronization levels by:
   further updating an updated set of descendent nodes by removing a second descendent node;
   selecting a second subset of the further updated set of descendent nodes to be a second set of indirect child nodes associated with the first networked node through the second direct child node according to a corresponding second set of hierarchical synchronization levels having lower priority than the second hierarchical synchronization level; and
   drafting the selected second descendent node to be the second direct child node of the first networked node by indicating the second set of indirect child nodes to the selected second descendent node to allow the second descendent node to continue configuring the second set of indirect child nodes according to the second set of hierarchical synchronization levels.

13. An apparatus to synchronize information obtained by a networked node, the apparatus comprising:
   a node selector to select a plurality of direct child nodes to receive the information undergoing synchronization directly from the networked node;
   a node list segmenter to select one or more sets of indirect child nodes, wherein each set of indirect child nodes is to receive the information undergoing synchronization through a respective direct child node instead of directly from the networked node; and
   a synchronization sequencer to schedule sending the information undergoing synchronization to a first direct child node associated with a first hierarchical synchronization level before sending the information to a second direct child node associated with a second hierarchical synchronization level having a lower priority than the first hierarchical synchronization level, wherein a first set of indirect child nodes is to receive the information through the first direct child node, and wherein the synchronization sequencer is to schedule sending the information to the first direct child node after the first direct child node has been configured to receive the information from the networked node regardless of whether the first set of indirect child nodes is configured to receive the information undergoing synchronization through the first direct child node.

14. An apparatus as defined in claim 13 further comprising a child drafting interface to:
   configure each of the plurality of direct child nodes to receive the information undergoing synchronization directly from the networked node; and send each set of indirect child nodes to the respective direct child node for configuring each set of indirect child nodes to receive the information undergoing synchronization through the respective direct child node.

15. An apparatus as defined in claim 13 wherein the synchronization sequencer is further configured to schedule sending the information undergoing synchronization to the plurality of direct child nodes based on a plurality of hierarchical synchronization levels respectively with which the plurality of direct child nodes are associated.

16. An apparatus as defined in claim 13 further comprising an error processor to determine at least one of whether configuration of the first direct child node to receive the information undergoing synchronization directly from the networked node was successful or whether sending the information to the first direct child node was successful.

17. A data network to support data synchronization, the data network comprising:

a plurality of networked nodes configurable to implement a synchronization hierarchy comprising a plurality of hierarchical synchronization levels, wherein each networked node assigned to a first hierarchical level is configurable to synchronize data received from one respectively configured parent node assigned to a second hierarchical synchronization level having a higher priority than the first hierarchical synchronization level, and configurable to transmit the data sequentially to a respective plurality of correspondingly configured child nodes assigned uniquely to a respective plurality of hierarchical synchronization levels each having a lower priority than the first hierarchical synchronization level; and a root node assignable to a highest priority synchronization level and configurable to obtain the data to be synchronized, to initiate configuration of the synchronization hierarchy and to transmit the data sequentially based on the synchronization hierarchy to a first plurality of correspondingly configured child nodes, wherein a first child node in the first plurality of child nodes is also configurable to be a first parent node to sequentially transmit the data based on synchronization hierarchy to a second plurality of correspondingly configured child nodes after receiving the data from the root node and while the root node is to transmit the data to at least a second child node in the first plurality of child nodes.

18. A data network as defined in claim 17 wherein the second child node in the first plurality of child nodes is also configurable to be a second parent node to sequentially transmit the data based on synchronization hierarchy to a third plurality of correspondingly configured child nodes after receiving the data from the root node and while the root node is to transmit the data to at least a third child node in the first set of child nodes.

19. A data network as defined in claim 17 wherein root node is configurable to be responsible for initiating configuration of the first plurality of child nodes to descend from the root node and the first child node is configurable to be responsible for initiating configuration of the second plurality of child nodes to descend from the first child node.

20. A data network as defined in claim 17 wherein the root node is further configured to add a new networked node to the synchronization hierarchy by randomly determining an existing leaf node of the synchronization hierarchy from which the new networked node is to descend.

21. A data network as defined in claim 17 wherein the root node is further configured to process removal of an existing networked node from the synchronization hierarchy by:
assigning a first descendent node associated previously with the removed existing node to a lowest hierarchical synchronization level relative to the root node;
configuring the root node to transmit the data to the first descendent node and the first descendent node to synchronize the data received from the root node;
configuring any remaining descendent nodes associated previously with the removed existing node to descend from the first descendent node.

22. A method to synchronize information among a plurality of networked nodes, the method comprising:
receiving information undergoing synchronization at a parent node;
sending the information sequentially from the parent node to each of a first set of nodes;
sending the information sequentially from a first node in the first set of nodes to each of a second set of nodes after the information is received by the first node, wherein the first node is to send the information to at least some of the second set of nodes at substantially the same time the parent node is to send the information to at least some of the first set of nodes other than the first node.

23. A method as defined in claim 22 further comprising sending the information sequentially from a second node in the first set of nodes to each of a third set of nodes after the information is received by the second node, wherein the second node is to send the information to at least some of the third set of nodes at substantially the same time the first node is to send the information to at least some of the second set of nodes and the parent node is to send the information to at least some of the first set of nodes other than the first and second nodes.

24. A method as defined in claim 22 wherein receiving the information undergoing synchronization at the parent node comprises receiving a first version of the information, and further comprising:
receiving a second version of the information undergoing synchronization at the parent node after the parent node has sent the first version of the information to the first node, but before the parent node has sent the first version of the information to a second node in the first set of nodes; and
sending the second version of the information instead of the first version of the information from the parent node to the second node and at substantially the same time the first node is to send the first version of the information to at least some of the second set of nodes.

* * * * *

UNITED STATES PATENT AND TRADEMARK OFFICE
CERTIFICATE OF CORRECTION

PATENT NO.       : 7,793,002 B2
APPLICATION NO.  : 12/134563
DATED            : September 7, 2010
INVENTOR(S)      : Brandon Hieb It is certified that error appears in the above-identified patent and that said Letters Patent is hereby corrected as shown below:

Column 36, line 3 (claim 11), after "indirect" delete "child, nodes" and insert -- child nodes --.

Signed and Sealed this
Eighth Day of February, 2011

David J. Kappos
*Director of the United States Patent and Trademark Office*